United States Patent
Pavani et al.

(10) Patent No.: US 8,644,349 B2
(45) Date of Patent: Feb. 4, 2014

(54) CLOCK RECOVERY IN A SYSTEM WHICH TRANSPORTS TDM DATA OVER A PACKET-SWITCHED NETWORK

(75) Inventors: Roberto Pavani, Sestri Levante (IT); Stefano Deprati, Genoa (IT); Lelio Giubergia, Vernante (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 84 days.

(21) Appl. No.: 13/321,005

(22) PCT Filed: Jun. 23, 2009

(86) PCT No.: PCT/EP2009/057779
§ 371 (c)(1),
(2), (4) Date: Mar. 7, 2012

(87) PCT Pub. No.: WO2010/149204
PCT Pub. Date: Dec. 29, 2010

(65) Prior Publication Data
US 2012/0155476 A1      Jun. 21, 2012

(51) Int. Cl.
*H04J 3/06* (2006.01)
(52) U.S. Cl.
USPC .......................................................... 370/503
(58) Field of Classification Search
None
See application file for complete search history.

(56) References Cited

U.S. PATENT DOCUMENTS

| | | | |
|---|---|---|---|
| 5,651,034 A * | 7/1997 | Oksanen et al. | 375/372 |
| 5,666,351 A * | 9/1997 | Oksanen et al. | 370/474 |
| 6,526,069 B1 * | 2/2003 | Wolf et al. | 370/503 |
| 8,494,363 B2 * | 7/2013 | Calderon et al. | 398/43 |
| 2005/0036520 A1 * | 2/2005 | Zeng et al. | 370/503 |

FOREIGN PATENT DOCUMENTS

| | | |
|---|---|---|
| EP | 2026485 | 2/2009 |
| EP | 2068471 | 6/2009 |

OTHER PUBLICATIONS

GR-253-CORE, SONET Transport Systems: Common Criteria, Issue, 4, Dec. 2005.
Gupta et al, RFC 4552, "Authentication/Confidentiality for OSPFv3", Jun. 2006.
ITU-T, Y.1413, Series Y: Global Information Infrastructure, Internet Protocol Aspects and Next Generation Networks, Internet Protocol Aspects—Interworking, TDM-MPLS Network Interworking—User Plane Interworking, Mar. 2004.

(Continued)

*Primary Examiner* — Clemence Han
(74) *Attorney, Agent, or Firm* — Nixon & Vanderhye, P.C.

(57) ABSTRACT

An ingress TDM network segment (101) and an egress TDM network segment (102) are connected by a packet-switched network (40). An ingress inter-working function (20) receives a TDM traffic flow (11) and an ingress data clock (12). A first mapping function (21) maps the TDM data (11) into first data containers using an ingress reference clock (22). The first mapping function conveys a difference between the ingress data clock (12) and the ingress reference clock (22) by a rate of justification operations to the mapped data within the first data containers. A second mapping function (23) maps the first data containers into second data containers using an ingress line clock (24). The mapping conveys a difference between the ingress reference clock (22) and the ingress line clock (24) by a rate of justification operations to the mapped data within the second data containers. Re-mapping is performed at boundaries between packet sub-networks (41, 42, 43).

24 Claims, 17 Drawing Sheets

(56) References Cited

OTHER PUBLICATIONS

ITU-T, G.707/Y.1322, Series G: Transmission Systems and Media, Digital Systems and Networks, Digital Terminal Equipments—General, Series Y: Global Information Infrastructure, Internet Protocol Aspects and Next-Generation Networks, Internet Protocol Aspects—Transport, Network Node Interface for the Synchronous Digital Hierarchy (SDH), Jan. 2007.

GR-253-CORE: Synchronous Optical Network (SONET) Transport Systems: Common Generic Criteria, (A Module of TSGR, FR-440, FR-SONET-17; and FD-29), Telcordia Technologies Generic Requirements, Issue 4, Dec. 2005.

International Search Report for PCT/EP2009/057779 mailed Jun. 18, 2010.

Metro Ethernet Forum: "Circuit Emulation Service Definitions, Framework and Requirements in Metro Ethernet Networks", Apr. 13, 2004, XP002572816, pp. 19-50.

\* cited by examiner

CLOCK RECOVERY IN A SYSTEM WHICH TRANSPORTS TDM DATA OVER A PACKET-SWITCHED NETWORK

This application is the U.S. national phase of International Application No. PCT/EP2009/057779 filed 23 Jun. 2009 which designated the U.S., and by which the entire contents of each of which are hereby incorporated by reference.

TECHNICAL FIELD

This invention relates to distributing a clock in a communications network.

BACKGROUND

In many communications networks there is a requirement for an accurate clock signal at each node of the network. The clock signal can be used to maintain synchronisation between the rate at which network nodes operate and to prevent problems such as the over-filling of network buffers.

In Synchronous Digital Hierarchy (SDH) networks, in which traffic flows are time-division multiplexed (TDM), accurate timing reference information is distributed to all SDH network nodes at the physical layer of the network. There is now considerable interest in distributing TDM traffic over packet-switched networks (PSN). Where TDM data is carried over a packet-switched network, and especially a packet-switched network comprising multiple independently-operated domains, the physical layer clock distribution techniques of an SDH network cannot be used. This poses a problem that the TDM network segments at each side of the packet-switched network no longer have ready access to the same clock reference.

Techniques for making a clock reference available at nodes of a packet-switched network include Differential Clock Recovery and Adaptive Clock Recovery (ACR). An overview of the Differential Clock Recovery method is shown in FIG. 1. An accurate reference clock 2 is made available at each network node such as by: providing each node with a GPS receiver which can derive an accurate GPS system clock; providing each node with an atomic reference; or distributing a common clock to each node. One technique for distributing a clock is the Precision Time Protocol (PTP) defined in IEEE 1588-2002. An ingress node to the PSN compares the clock rate of a signal 3 with the reference clock to form a clock differential, and sends the clock differential 4 to an egress node. The egress node can then use the received clock differential 4, and the reference clock 2, to recover a local clock 5 at the egress node. In an Adaptive Clock Recovery method a common clock is not made available at all network nodes. Instead, an egress node recovers a clock by using an averaging process 8 performed over a suitably long period of time. Where data is sent at a constant bit rate at the ingress side, the egress node knows that the average rate of the recovered data should equal the rate at which the data was sent. The quality of the recovered clock obtained using the Adaptive Clock Recovery method is affected by the Packet Delay Variation (PDV) in the PSN, and this can require a long averaging period at the egress node.

Both of the known methods have disadvantages. Differential Clock Recovery has a disadvantage of either requiring additional receiving apparatus at each node, or relies on a distribution path for the clock which can be different to that of the traffic. The Adaptive Clock Recovery method can be affected by synchronisation source switches (e.g. because of a protection switch in the synchronisation network) which can cause the clock source to move within the recommended standard requirements (e.g. G.823, G.813) but the recovered clock will not follow this variation because of the longer-term filtering used at the receive nodes.

SUMMARY

A first aspect of the present invention provides a method of clock recovery at an ingress inter-working function according to claim 1.

An advantage of the method is that the ingress data clock can be transferred through the packet-switched network without the need to distribute a common reference clock to the ingress inter-working function and the egress inter-working function. This reduces apparatus at the inter-working functions and avoids the need for inter-working functions to send further packets through the packet-switched network for the purpose of acquiring an accurate common clock. A further advantage is that events in the packet-switched network affect data and clock recovery in the same way.

Advantageously the method comprises performing a second mapping function after the first mapping function and before the packetising function, the second mapping function mapping the first data containers into second data containers, wherein the second mapping function uses an ingress line clock and the mapping conveys a difference between the ingress reference clock and the ingress line clock, the difference being conveyed by a rate of justification operations to the mapped data within the second data containers.

The justification operations can use a justification field in a data container, where the justification field selectively carries useful data (at least one bit, or at least one byte) or stuff data depending on the difference between the clocks.

Another aspect of the present invention provides a method of clock recovery at an egress inter-working function according to claim 11.

A further aspect of the present invention provides a method of processing packets carrying clock information at a node between a first packet sub-network and a second packet sub-network according to claim 19.

Further aspects of the invention provide apparatus for performing the methods. Especially where first and second mapping functions are used, the method has strong immunity from network packet delay variance (PDV).

A further advantage is that the method can be applied to systems where multiple, different, data clocks are used (e.g. data clocks of multiple operators) and these data clocks need to be carried across the packet-switched network and independently recovered at egress inter-working functions.

Especially where first and second mapping functions are used, the method has an advantage of preserving the relationship between the data clock and ingress reference clock, as the contents of the first data containers are not altered.

The method can be implemented across multiple domain/ multiple operator networks with high clock quality.

The methods can be applied to a range of PSN topologies. When an operator upgrades the PSN to a synchronous PSN (e.g. from conventional Ethernet to Synchronous Ethernet) it is possible to add, at the packet network boundary, the re-mapping function to improve the quality of the TDM transport across that sub-network. When all of the traversed sub-networks have been upgraded to synchronous networks the use of re-mapping at each boundary will give a high clock quality without the need of a common distributed clock at the ingress IWF and egress IWF.

The functionality described here can be implemented in software, hardware or a combination of these. The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to the perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to a processing apparatus via a network connection.

BRIEF DESCRIPTION OF THE DRAWINGS

Embodiments of the invention will be described, by way of example only, with reference to the accompanying drawings in which.

DETAILED DESCRIPTION

Figure 1:
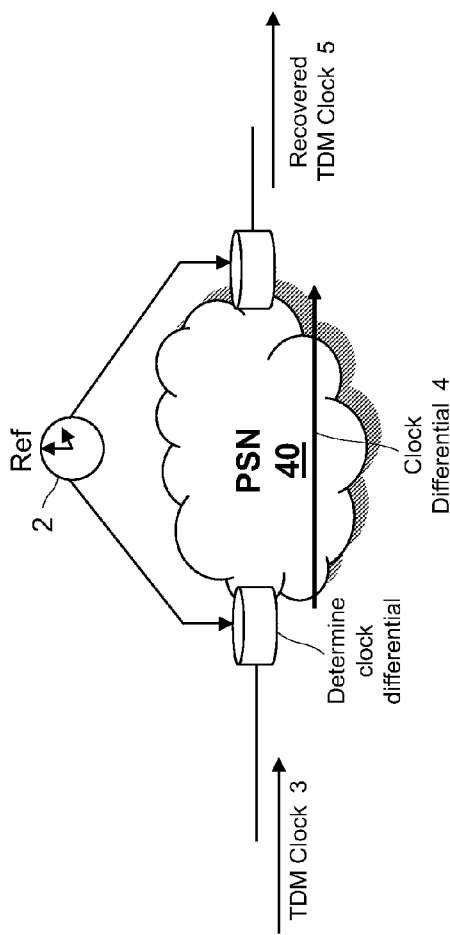
FIG. 1 shows a Differential Clock Recovery technique for clock recovery across a packet-switched network.
Figure 2:
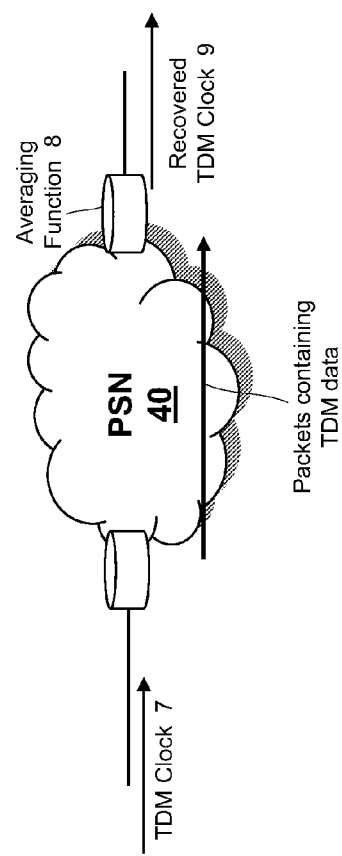
FIG. 2 shows an Adaptive Clock Recovery technique for clock recovery across a packet-switched network.
Figure 3:
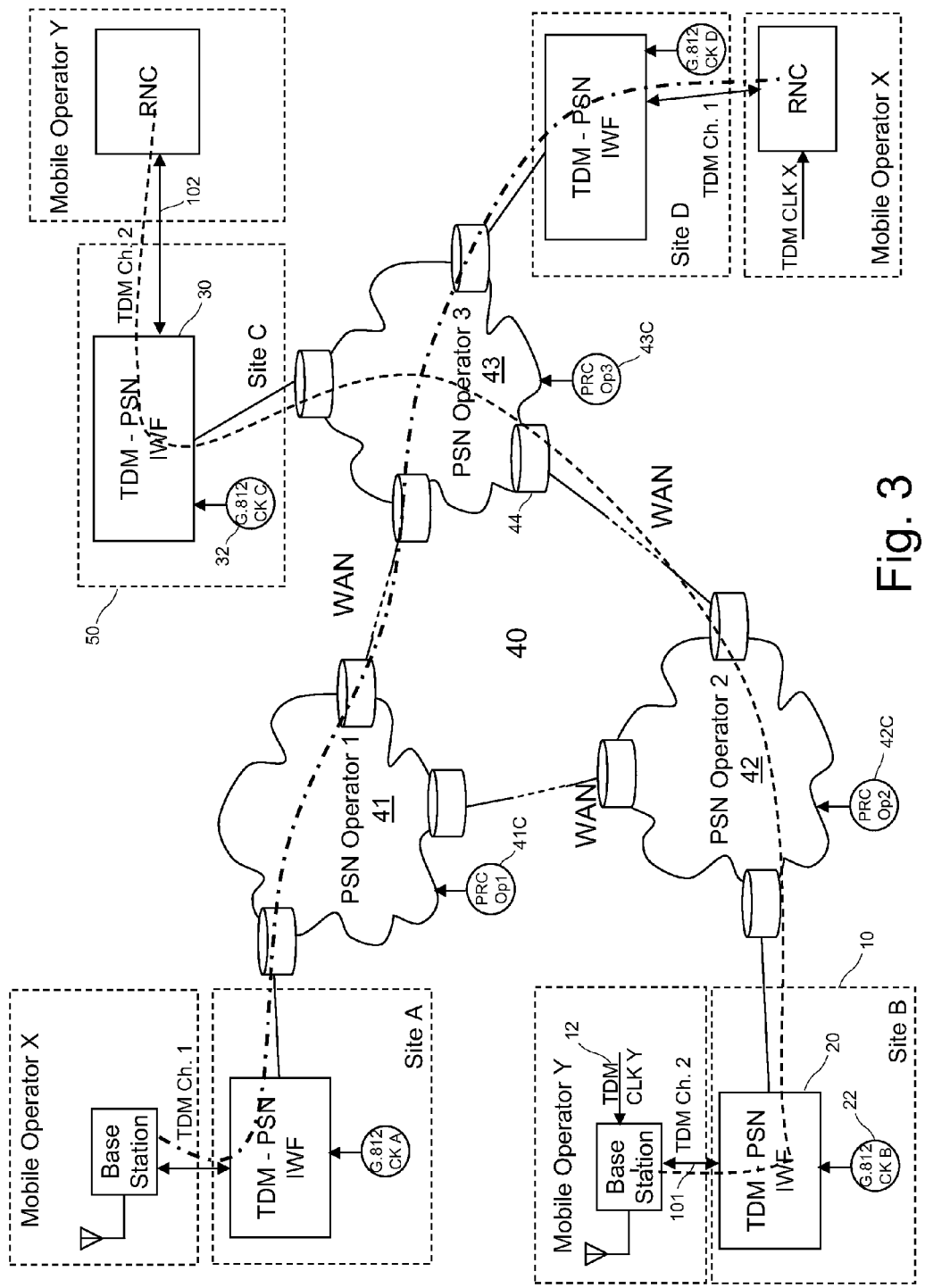
FIG. 3 shows a network with TDM network segments connected by paths across a packet-switched network.
Figure 14:
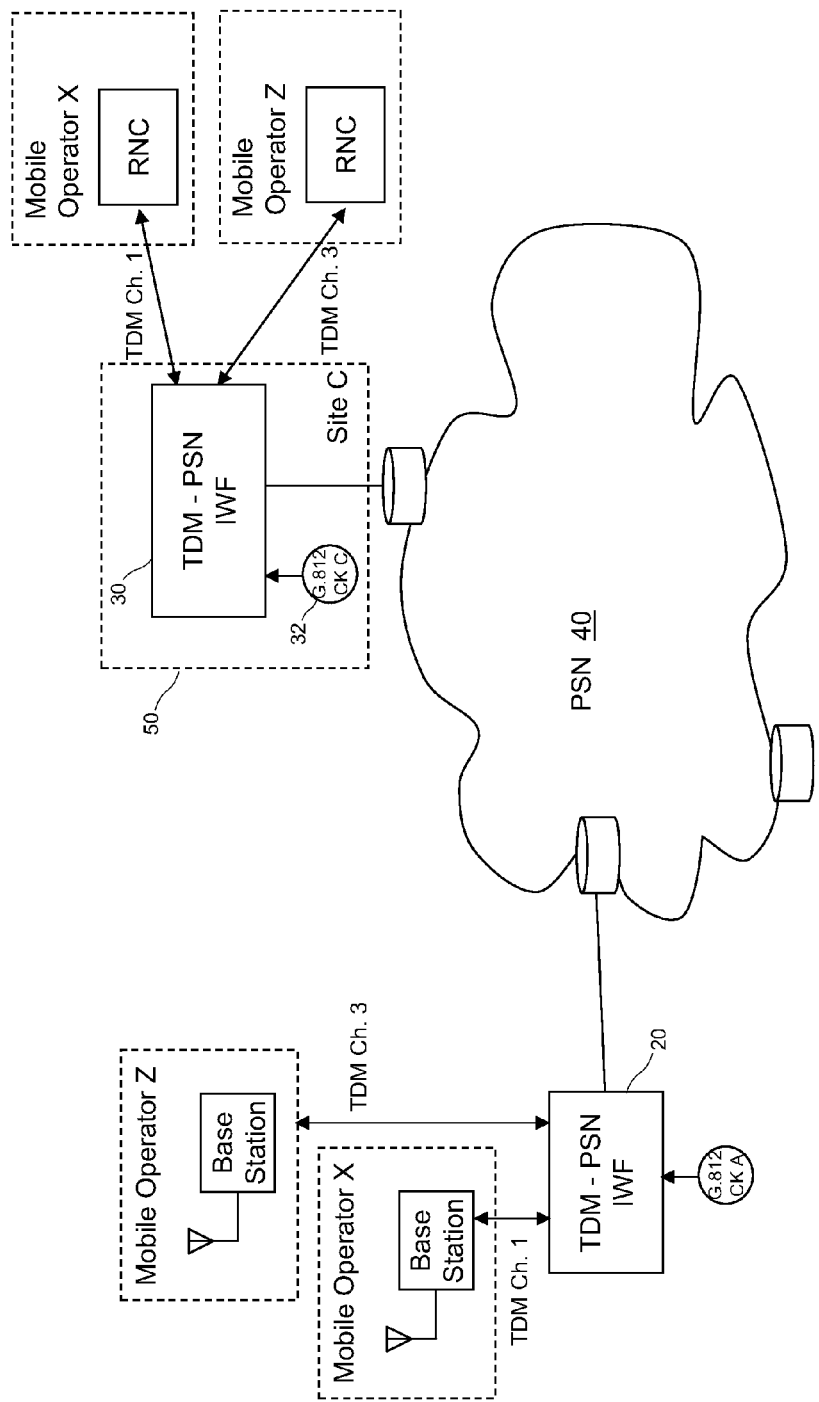
FIG. 14 shows a network with TDM network segments connected by paths across a packet-switched network, where multiple operators share the same Inter-working function (IWF)

FIG. 3 shows an example communications network in which the invention can be implemented. The network shown in FIG. 3 comprises a packet-switched network (PSN) 40 which connects TDM network segments 101, 102 of a wireless operator. Inter-working functions (IWF) 20, 30 are positioned at each interface between a TDM network segment and the PSN 40. In the ingress direction to the PSN, the IWF 20 packages TDM traffic into a form suitable for transport over the PSN 40. In the egress direction from the PSN, the IWF 30 unpacks data from packets received from the PSN 40 for onward transmission in TDM form. Multiple wireless operators use the same PSN 40. A Mobile Operator X has TDM network segments connecting to IWFs at sites A and D. A Mobile Operator Y has TDM network segments 101, 102 connecting to IWFs at sites B and C. The TDM traffic is carried by respective paths through the PSN 40. Mobile Operators can also share the same IWFs, as shown in FIG. 14. An IWF has functionality for processing TDM traffic in the ingress direction to the PSN and for processing packetised traffic in the egress direction from the PSN.

In a first TDM network segment 101 a TDM traffic flow is formed. The TDM traffic flow comprises time-multiplexed data from one or more traffic sources. The term "data" is a generic term for data, voice, video, multimedia or any other content. In FIG. 3, a wireless base station of Mobile Operator Y serves multiple wireless terminals users via an air interface. Data from the base station is backhauled to the switching centre of Operator Y, which is connected to Site C. The backhauling comprises mapping data from the air interface into slots of a TDM traffic flow. Typically, an elementary TDM traffic flow has a rate of around 2 Mbit/s and elementary traffic flows are multiplexed together into higher rate flows. The TDM traffic flow of an operator is clocked at a respective TDM clock rate particular to that operator, shown as CLK Y. The IWF 20 packages TDM traffic into a form suitable for transport over the PSN 40. Packets are received at a site C where an IWF 30 demaps the TDM data for onward transport across another TDM network segment 102 to another part (in this example a Radio Network Controller, RNC) of Operator Y's network. A similar set of apparatus is shown for Mobile Operator X. Although the TDM network segments shown in FIG. 3 each comprise a single TDM link, they can comprise a more elaborate network of TDM links and TDM network nodes. The term "TDM" is intended to cover schemes such as Synchronous Digital Hierarchy (SDH), Synchronous Optical Networking (SONET) and Plesiochronous Digital Hierarch (PDH). The TDM traffic can be carried over a packet-switched network (PSN) using a technique such as: Circuit Emulation Service over Packet (CESoP); Structure-Agnostic Time Division Multiplexing (TDM) over Packet (SAToP) defined in RFC 4553; the Metro Ethernet Forum's (MEF) MEF-8, Implementation Agreement for the Emulation of PDH Circuits over Metro Ethernet Networks; and the International Telecommunications Union (ITU) Y.1413 TDM pseudowires.

Multiple clocks are used within the network shown in FIG. 3, and these can differ in their relative accuracy. Clocks CLK X, CLK Y are provided by the wireless operators and determine the rate and multiplexing of TDM data within that operator's TDM network. Clocks CK A, CK B, CK C, CK D are locally provided at the IWFs. Typically they are good quality, e.g. conforming to ITU G.812 quality standards. A further clock may be used within each separately operated domain of the packet network 40. In FIG. 3, clocks 41C, 42C, 43C are used within the PSN domains 41, 42, 43.

It is desirable that the TDM clock (e.g. CLK Y) used in an ingress TDM network segment 101 is carried across the PSN 40 and accurately recovered at the egress network segment 102, so that the TDM network segments 101, 102 operate as if they were directly connected by a TDM network with a common TDM network clock. In an embodiment the TDM clock (also called a service clock or a data clock) is carried across the PSN 40 by two stages of mapping the TDM data within respective TDM transport containers. In another embodiment the TDM clock is carried across the PSN 40 by a single stage of mapping TDM data within a TDM transport container.

Figure 4:
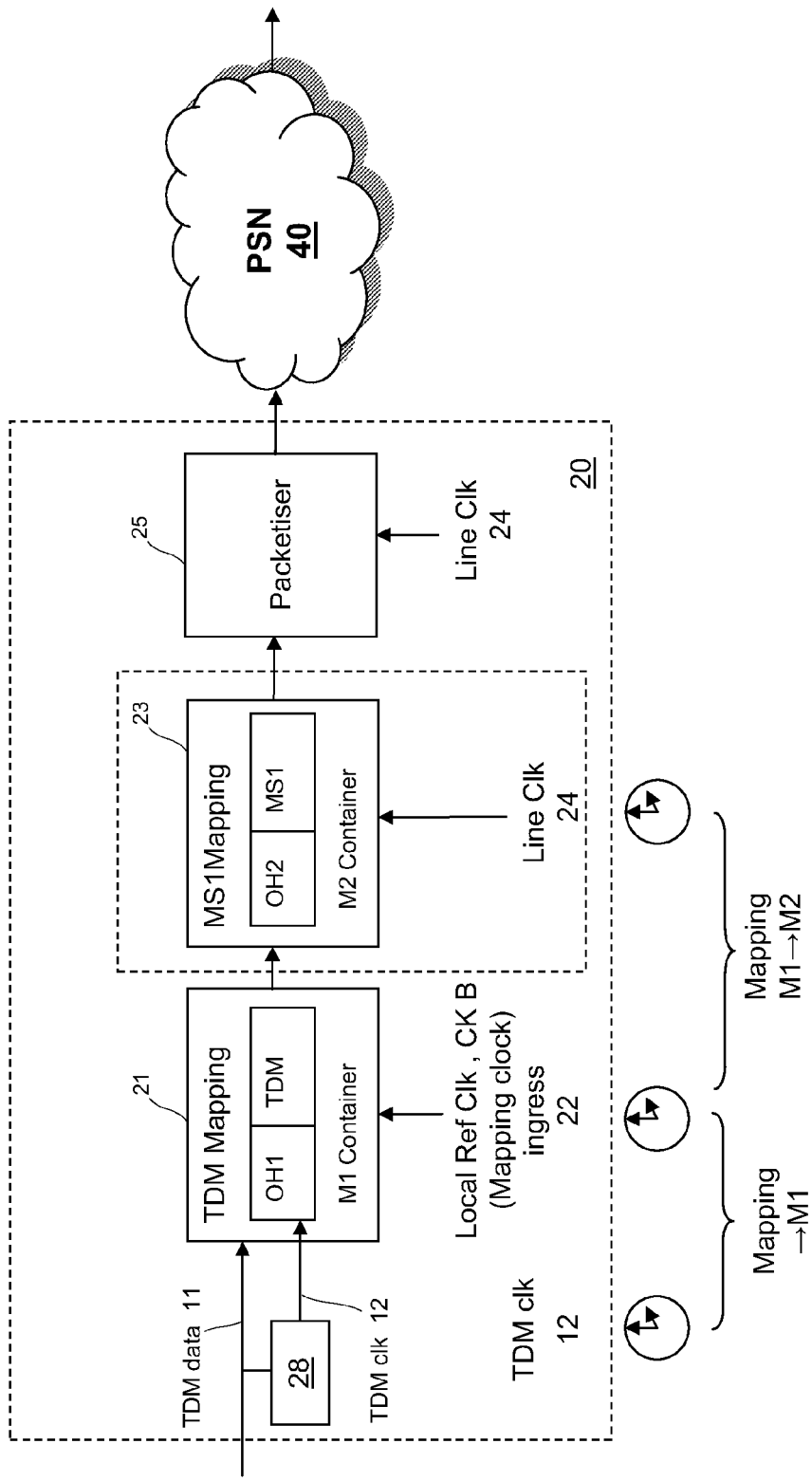
FIG. 4 shows apparatus at an ingress Inter-working function (IWF) of the network of FIG. 3.

FIG. 4 shows an overview of the processes performed at an inter-working function (IWF) 20 at the ingress to the PSN 40. The IWF receives TDM data 11 and a TDM clock 12. Typically, the TDM data 11 arriving at the IWF 20 is encoded at the physical layer with the TDM clock 12, such as by using a line coding technique. The TDM clock 12 is extracted from the link carrying the TDM data 11 by a Clock and Data Recovery circuit 28.

A first mapping stage 21 maps the TDM data 11 inside first data containers M1 using the IWF local reference clock, CK B, as the mapping clock. The mapping process applies justifications to the data which compensates for the difference in rate between the TDM CLK Y (the TDM clock, or service clock) and the CK B Local Reference Clock at the IWF 20. The M1 containers are then applied to a second mapping stage 23 which maps the M1 containers into M2 containers using the line clock 24 of the PSN. The second mapping stage 23 applies justifications which compensate for the difference in rate between the Local reference clock 22 (CK B) and the line clock 24. A packetising function 25 maps the M2 containers into packets having a format suitable for transmission over PSN 40. For example, a packet header can carry an address of the egress IWF 30 to which the packets should be sent. The packets can be sent across a PSN with a single domain, or across a PSN with multiple independently-operated domains 41, 42, 43.

The lower part of FIG. 4 shows the effect of the two stages of mapping. Mapping stage 21 conveys a difference between the TDM clock 12 (CLK Y) and the local reference clock 22 (CK B) as justifications to the TDM data carried within containers M1. Mapping stage 23 conveys a difference between the local reference clock 22 (CK B) and line clock 24 as justifications to the data carried within containers M2.

Figure 5:
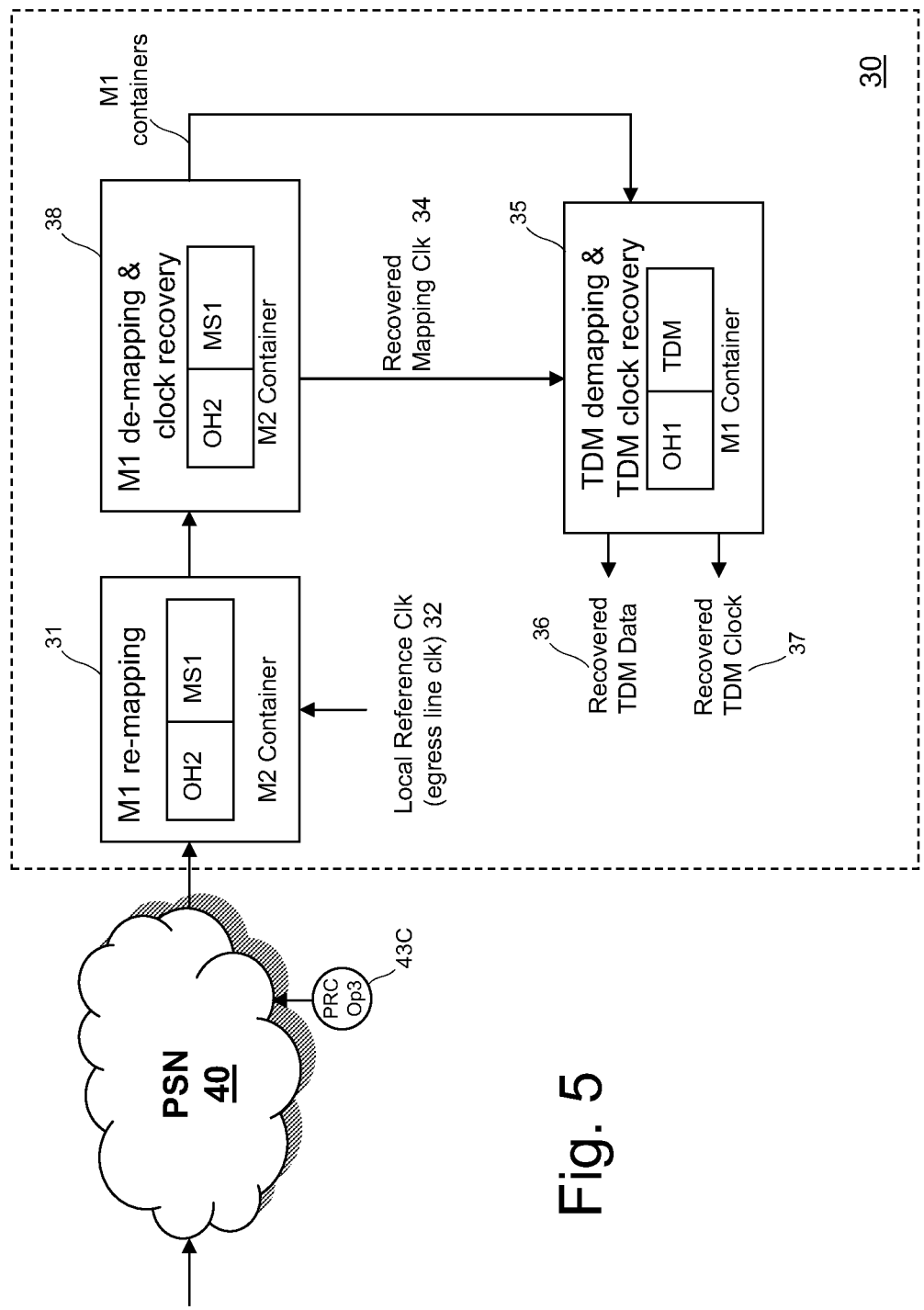
FIG. 5 shows apparatus at an egress Inter-working function (IWF) of the network of FIG. 3.

FIG. 5 shows an overview of the processes performed at an inter-working function (IWF) 30 at the egress of the PSN 40. An optional first stage of the egress IWF 30 is a re-mapping stage 31. M1 containers are extracted from the M2 containers and packets received from the PSN 40 and re-mapped to new M2 containers which are synchronized to the rate of the local reference clock 32 at the egress IWF 30. This allows the M2 containers to carry information about the relative rates of the local reference clock 32 and the line clock 43C used in the PSN 40.

M1 containers are demapped from containers M1 at stage 38. A mapping clock 34 is recovered from the M1 containers, and this should be a replica of the mapping clock 22 used at the ingress IWF 20. The process of recovering the mapping clock can require a significant period of time as the filtering used in stage 38 will have a slow response (e.g. very low PLL bandwidth) to reconstruct an accurate copy of the ingress reference clock. All of the PSN phase noise, such as Packet Delay Variation (PDV) and other effects, is filtered out at this stage. The recovered mapping clock 34 is applied to the final demapping stage 35, where it is used to open the M1 containers and extract the TDM data 36 and the original TDM clock 37 used in the ingress segment. The recovered TDM clock 37 can be used to send TDM data in the opposite direction, from Site C to Site B.

An advantage of this scheme is that the data within the M1 containers is not altered at any point between the ingress IWF 20 and the egress IWF 30 and therefore the relative timing of the TDM clock 12 (CLK Y) to the ingress reference clock 22 is preserved during transmission across the PSN 40, and can be accurately recovered at the egress IWF 30.

The term "data containers" is intended to include any data structure which is capable of accommodating TDM data and justification operations on the data. Various data containers can be used as the containers M1 and M2 described here. When the TDM is an E1 (2048 Kbps) suitable data containers for M1 and M2 are VC-12 and TU-12 respectively. E1 data is mapped VC-12→TU-12 using 2048 Kbps asynchronous mapping (10.1.4.1 G.702). TU-12 frequency is locked to the local (ingress) reference clock. The TU-12 is then mapped inside a packet and sent through the network to the egress side. At egress side the VC-12 data inside the TU-12 will be extracted and re-justified inside a new TU-12 container locked to the local (egress) reference clock. A filtering of the TU-12 justification is required to "recover" the ingress reference clock. Because the reference clock has specified quality (e.g. G.823+/−4.6 ppm) it is possible to limit the recovering justification filtering block. After the filtering process the original E1 frequency can be extracted from the VC-12 through the C1,C2 justification control bits. As final results the E1 clock movements are stored as C1,C2 variations, while reference clocks variation and major phase noise caused by PDV will be filtered through re-justification mechanism. The re-justification filtering mechanism can be a very slow process and is only related to "lock" the egress side to the ingress side; e.g. very narrow bandwidth PLL. The E1 demapping can be performed using a standard PLL to demap E1 data from VC-12 container. This will lead to a faster egress clock response to ingress E1 phase/frequency variation.

In summary, TDM data is mapped inside an M1 container with a frequency "locked" to the ingress IWF reference clock. This M1 container is then mapped to an M2 container locked to the ingress reference clock, but with justification capability able to accommodate the allowed clock precision.

Figure 6:
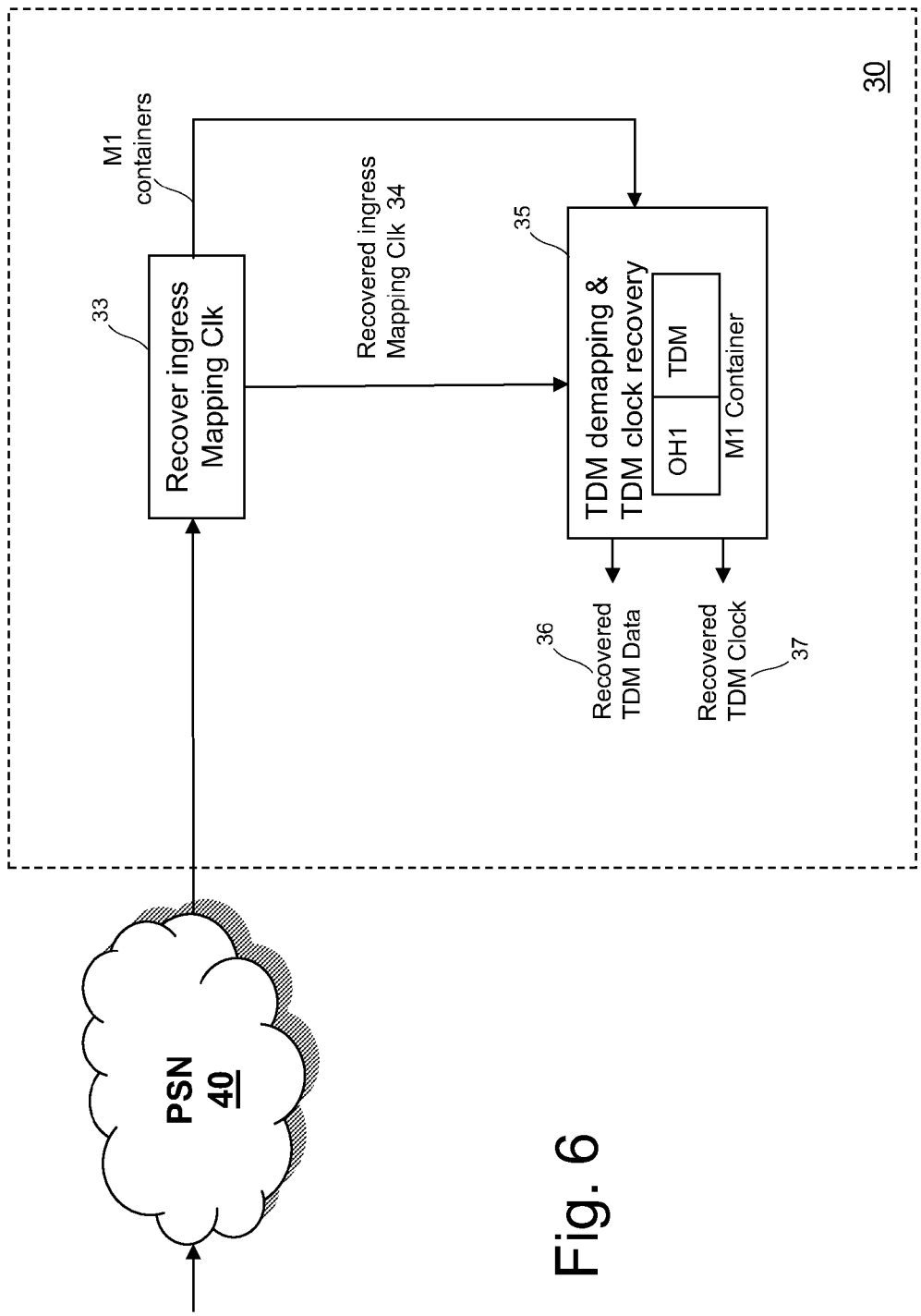
FIG. 6 shows alternative apparatus at an egress Inter-working function (IWF) of the network of FIG. 3.

The clock information can be carried with the two stages of mapping 21, 23 described above. A simpler embodiment uses a single stage of mapping at the ingress IWF 20. Referring again to FIG. 4, M1 containers output by stage 21 are applied directly to the packetising stage 25, with no second mapping stage 23. The corresponding egress IWF 30 for this embodiment is shown in FIG. 6. Packets received at the egress IWF 30 are applied to a mapping clock recovery unit 33. The recovered mapping clock 34 is applied to a demapping stage 35 and is used to recover the TDM clock and TDM data.

A further feature of the network of FIG. 3 is that the overall packet-switched network 40 can comprise multiple packet-switched network domains 41, 42, 43 which are individually operated. Each domain 41, 42, 43 of the PSN can operate with a clock 41C, 42C, 43C which is different to the other domains. The domains 41, 42, 43 can be synchronous or asynchronous in their operation. In a synchronous PSN packets are transmitted at a regular rate. In an asynchronous PSN packets are not transmitted at a regular rate.

The justification processes used in the mapping stages 21, 23 can take various forms. Justification is a technique which is used in TDM networks, such as networks based on PDH, SDH or SONET technology. The conventional use of justification is to allow for some slippage between clock rates used at different nodes of a network. In PDH networks a TDM frame includes justification opportunity bits which can be selectively used to carry an additional bit, or bits, of TDM data. Justification control bits in the TDM stream indicate whether the justification opportunity bits carry useful data or stuffing, which can be ignored. In synchronous networks (e.g.

SDH or SONET) TDM data is carried inside containers of a fixed size, and the starting point of the data is allowed to move within the containers. The starting point (or "offset") of data within a data container is indicated by a pointer which is carried within an overhead section of the data container. Positive justification and negative justification opportunities are possible. During a positive justification event the pointer to the start of the frame is incremented and a byte of the container is left unfilled. During a negative justification event the pointer to the start of the frame is decremented and a pointer byte in the overhead section of the synchronous frame is used to carry a byte of TDM data. Detailed information on the SDH and SONET justification schemes is available in standards documents for G.707 (SDH) and GR-253-CORE (SONET).

The choice of a particular justification scheme and choice of M1/M2 containers affects the recovered clock quality. For E1 transport the choice of TU-12/VC-12 containers allows reuse of existing circuits in SDH/SONET networks. From a clock quality point of view, single bit justification slots give better jitter results. For circuit emulation applications it is advantageous to have a single justification field inside each container (advantageously single bit justification).

The stages of the ingress IWF 20 will now be described in more detail with reference to FIGS. 7 to 9.

Figure 7:
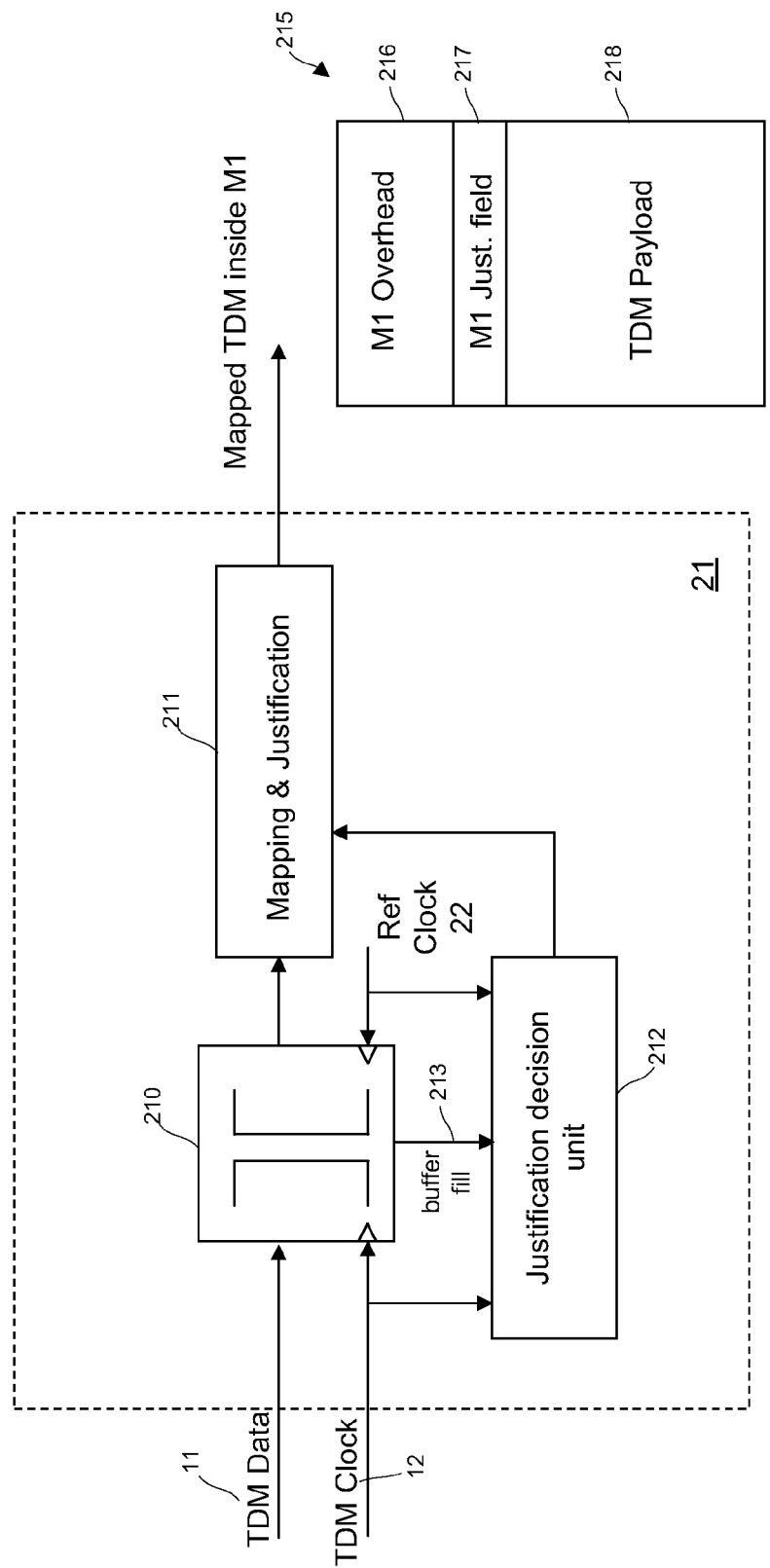
FIG. 7 shows a first mapping stage used in the ingress Inter-working function (IWF) of FIG. 4.

FIG. 7 shows the first mapping stage 21. TDM data 11 and a TDM clock 12 are applied to inputs of a buffer 210. The term "buffer" means an elastic data store into which data is temporarily stored. TDM data is read into the buffer 210 at the rate of the TDM clock 12. Data is read from the buffer into payloads of containers at a rate determined by the reference clock 22 (CK B). A mapping and justification unit 211 maps the TDM data into an M1 container 215. The M1 container 215 (e.g. an SDH VC-12 container) comprises an area 218 for carrying a payload of TDM data, an overhead section 216 and a section 217 for carrying justification data. Section 217 can selectively carry: an additional quantity of useful data when a justification event is required; or stuff data. Depending on the particular justification scheme, a justification event may be permitted once per container or on a less frequent basis. As an example, a justification scheme may require that two containers which carry justification events must be separated by a non-justified container. The justification scheme, the container size, the justification size and rules depends on the payload, the frequency and other considerations regarding the requested TDM clock quality (jitter).

The justification decision unit 212 compares the rate of the TDM clock 12 and the rate of the reference clock 22 and determines when a justification event should occur in the mapped data. The justification decision unit 212 provides an output to the justification block 211. The justification block 211 causes a justification event when there is a suitable difference between the clocks 12, 22 and when the rules of the justification scheme permit a justification event to occur. The Justification decision unit 212 can directly compare the rate of the TDM clock 12 and the rate of the reference clock 22 or it can receive an input which is indicative of this difference, such as the buffer fill level 213. The Justification decision unit 212 can be implemented as a phase comparator and filter. Containers M1 are generated at a fixed rate. The justification decision of unit 212 affects the buffer fill level. A decisional loop (similar to a PLL) can balance the amount of data written to buffer 210 and the amount of data read from buffer 210. There are two main techniques to achieve this. One technique is "threshold" based. When the buffer fill level is below one threshold, unit 212 will select containers M1 with less data. This will allow the buffer fill level to increase. When the buffer fill level is above the same threshold unit 212 will select containers M1 with more data, i.e. with justification data. This will allow the buffer level to decrease. Another technique is regarding the unit 212 acting like a PLL. A PLL is composed of a phase comparator, a filter and a controlled oscillator. On a PLL the phase error is filtered and the output is used to control the output frequency. A justification block will use the filtered phase error to determine whether to justify or not.

A range of justification schemes can be used. Some justification schemes have three different justification possibilities: C−, C0, C+ and other schemes have four different justification possibilities: C−, C0, C+ and C++, where: C0 indicates no justification; C− indicates negative justification; C+ indicates positive justification; and C++ indicates positive justification with an increased amount of justification compared to C+. In SDH networks it is typical to have zero justification rate when nominal frequency is used because there are two different justification opportunities: negative and positive. In PDH networks a non-zero justification ratio (e.g. 2/7) at nominal frequency is preferred to give better output clock quality in terms of jitter.

TDM data is received at a constant rate. M1 containers 216 have a fixed size and are created at a constant rate. If the TDM clock 12 and System clock 22 are both of a high quality, the filtering function of the justification decision unit 212 can be relaxed (e.g. 1 kHz bandwidth or even more). The amount of TDM data inside the M1 container depends on the justification decision.

Figure 8:
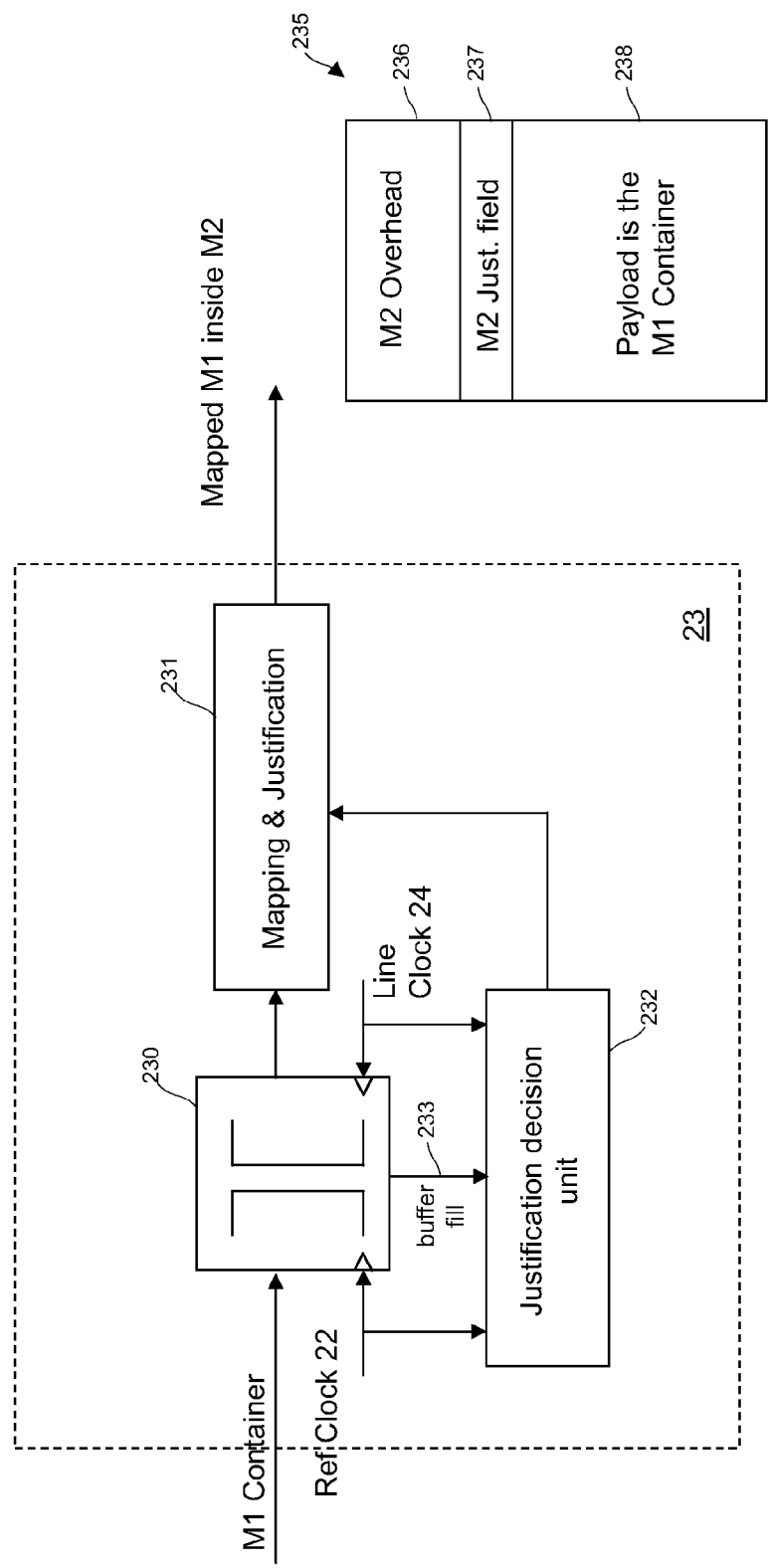
FIG. 8 shows a second mapping stage used in the ingress Inter-working function (IWF) of FIG. 4.

FIG. 8 shows the second mapping stage 23. M1 containers and the system clock 22 are applied to inputs of a buffer 230. The line clock 24 is applied to an input of the buffer 230. A Justification decision unit 232 determines a difference between the rate of the system clock 22 and the line clock 24. A mapping and justification unit 231 maps the M1 containers into M2 containers. M2 containers are created at fixed rate with respect to the line clock. Advantageously, the containers M1, M2 are similarly sized, and a single M1 container is mapped into a single M2 container, although other arrangements are possible. The M2 container 235 (e.g. an SDH TU-12 container) comprises an area 238 for carrying the M1 container payload, an overhead section 236 and a section 237 for carrying justification data. Section 237 can selectively carry: an additional quantity of useful data when a justification event is required; or stuff data. A justification event can occur when there is a suitable difference between the rates of the system clock 22 and the line clock 24, causing an additional bit or byte to be carried alongside that frame of TDM data. The Justification decision unit 232 provides an output to the justification block, and determines when justification events should occur. In the case of the line clock 24 being locked with the system clock 22, a nominal (fixed) justification rate can be used.

Figure 9:
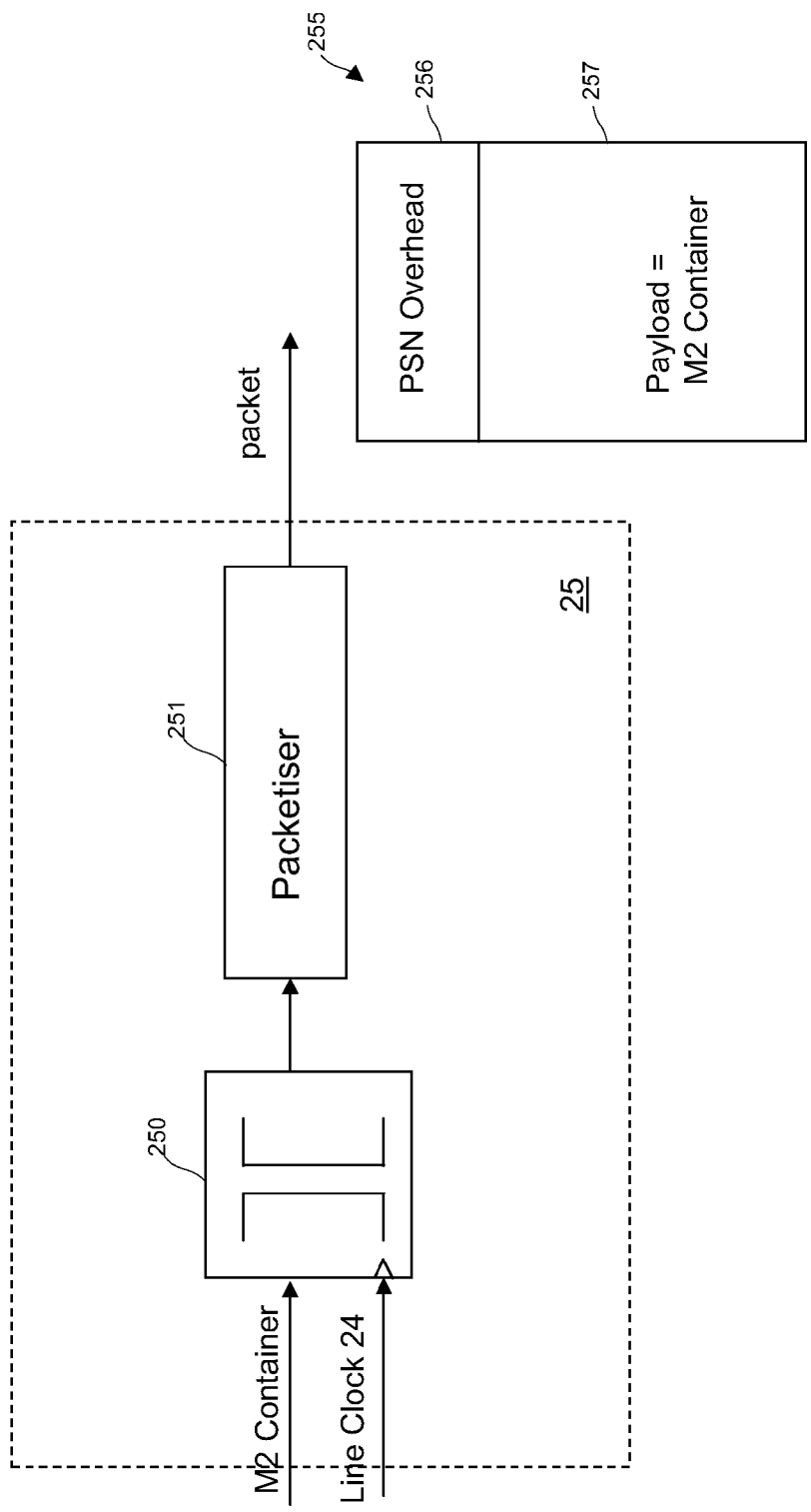
FIG. 9 shows a packetising stage used in the ingress Inter-working function (IWF) of FIG. 4.

FIG. 9 shows the packetising stage 25. M2 containers and the line clock 24 are applied to the inputs of a buffer 250. A mapping block 251 maps M2 containers into payloads of packets 255 for transmission over the PSN 40. Advantageously, the packets 255 each have a fixed size and comprise a payload section 257 and an overhead section 256. Advantageously, the packets are Ethernet packets with an overhead section 256 carrying a MAC address, type (with or without MPLS and/or VLANs etc.) or IP packets with an overhead section carrying IP address, MAC address, type etc. The packets 255 can be sent over a synchronous or an asynchronous PSN.

Figure 10:
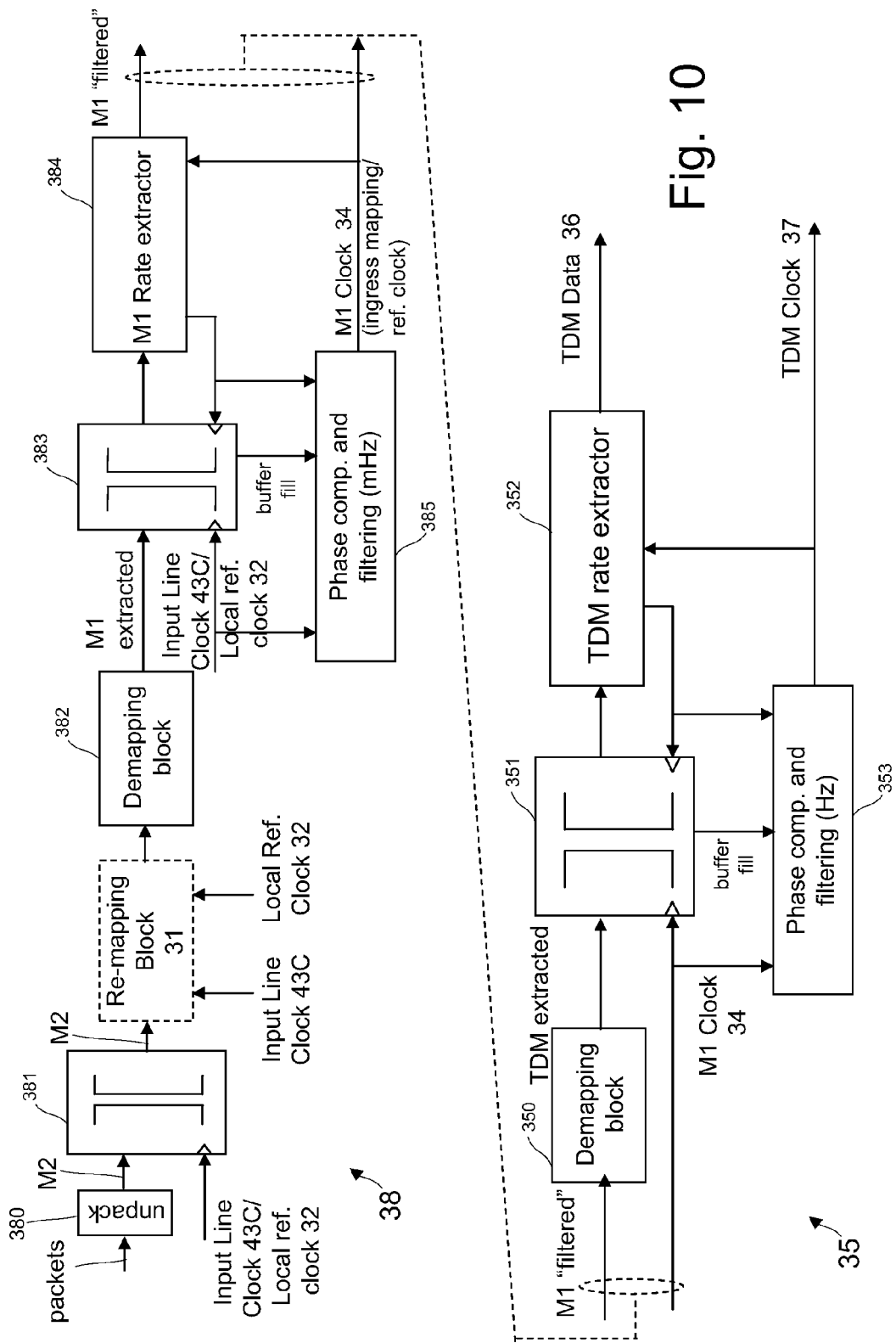
FIG. 10 shows the apparatus of FIG. 5 for use at an egress Inter-working function (IWF) in more detail.

The stages of the egress IWF 30 will now be described in more detail with reference to FIGS. 10 to 12. FIG. 10 shows the overall process for demapping at the egress IWF 30 where a dual mapping scheme has been used at the ingress IWF 20.

Packets are received from the PSN 40. Received packets are unpacked 380. The unpacked M2 containers and a line clock 43C (i.e. the line clock used by the local domain of the PSN) or a local reference clock 32 (i.e. reference clock of the IWF 30) are applied to inputs of a buffer 381. An optional re-mapping stage 31 can be performed.

A demapping block 382 extracts M1 containers from the payloads of M2 containers. M1 containers and the input line clock 43C/reference clock 32 are applied to inputs of another buffer 383. The M1 clock rate is derived through a very low bandwidth timing recovery unit (e.g. phase-locked loop PLL). This is shown as a rate extractor 384 and a phase comparator and filter 385 which determine a difference between the rate of the input line clock 43C/reference clock 32 and the rate output by the M1 rate extractor 384. The data written to the buffer 383 is the extracted M1 containers. Because M1 containers are each carried inside M2 containers with justification and extra overhead, the write process to buffer 383 is intermittent. The clock used to write the data is the line clock 43C (or the reference clock 32 if the optional remapping function is used). The data write rate is the M1 data rate. The M1 rate extractor 384 is a "continuous" process, or at least has a "regular" rate, that will read the M1 containers from the buffer 383. The phase comparator and filtering unit 385 can include a numerically controlled oscillator (NCO), with the NCO being dependent on the difference between the input M1 data rate and the output of the M1 rate extractor. An alternative is to use a clock enable structure where the local reference clock, or a system clock running at a higher frequency than the M1 clock, is enabled during certain cycles to form the M1 clock. This has an advantage of avoiding the need for an additional oscillator, and allows the same apparatus to be used with different traffic flows having different rates, as it is only necessary to provide a different "enable" signal for each traffic flow. Alternatively, or additionally, unit 385 can make use of the buffer fill level of buffer 383 when determining the M1 clock rate 34.

A TDM demapping block 350 extracts TDM data to be written to the buffer 351. The TDM data is read with a "fixed" rate by the TDM rate extractor 352. The rate extractor 352 comprises a read address generator driven by the "filtered" clock (or clock enable). The phase comparators used in units 385, 353 compare the rates at which data is written and read from a respective buffer 383, 351.

The recovered M1 clock will have a good quality because of the ultra-narrow bandwidth of the M1 clock timing recovery. The TDM data inside the M1 containers is extracted by writing the data into the buffer 351 and performing a timing recovery that will filter all the TDM justifications inside the M1 containers. This filter only needs to follow the possible variation in the TDM clock used at the source. Because of possible changes in the synchronization source for the TDM signal, it is advantageous to follow the TDM clock in a relatively "short" timescale. The filtering bandwidth of the TDM clock recovery can have a locking time that is in range of seconds. The filtering bandwidth of the M1 clock can have a locking time of the order of thousands of seconds (very low bandwidth) in order to accommodate network PDV and timing variations. Because these variations are not related to the TDM signal, they can be performed over a "very long" time, without any relevant impact on the TDM clock recovery process.

Figure 11:
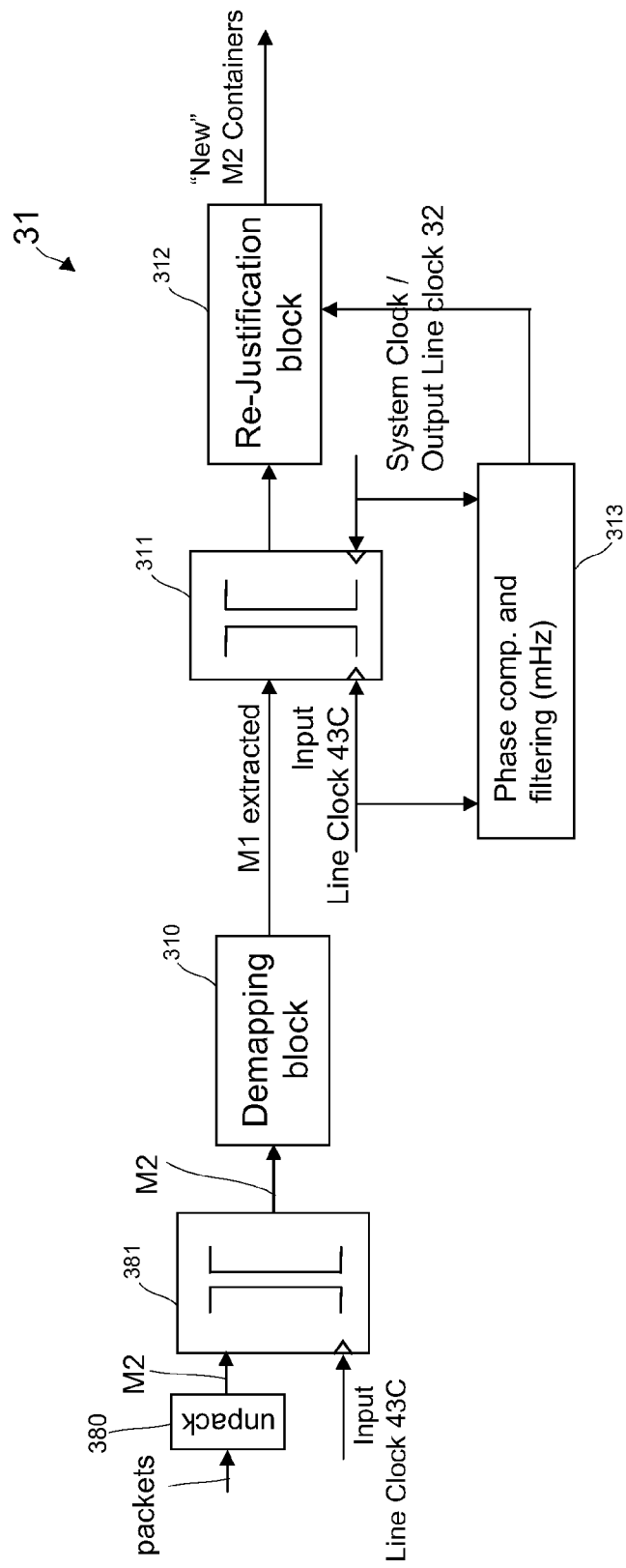
FIG. 11 shows an optional re-mapping stage used in FIG. 10.

FIG. 11 shows the re-mapping stage 31 of FIG. 10. The purpose of this stage is to determine the difference between the rate of the clock 43C used in the domain 43 of the PSN nearest to the egress IWF 30 and the system clock used at the egress IWF 30. M2 containers are unpacked from received packets. The M2 containers and the input line clock 43C of the local PSN domain 43 are applied to the inputs of buffer 381 (same buffer as shown in FIG. 10). M1 containers are extracted 310 from the M2 containers. The extracted M1 containers and the input line clock 43C are applied to another buffer 311. A timing unit 313 determines the difference between the input line clock 43C and the system clock/output line clock 32 of the egress IWF 30. The determined difference is applied to a justification block 312 which updates the justification information of the M1 containers within new M2 containers. One method to do this is to check the buffer 311 fill value.

If the packet is received from a synchronous network, the M2 rate is fixed with respect to the Line Clock 43C. In this case the M2 container is read from the buffer 381 at a fixed rate, a simple justification interpretation function is performed to extract the M1 container from M2. When the packet network is asynchronous, the M2 rate is not related to the line clock 43C and the M1 extracted rate is a mix of packet arrival times (having a distribution of values due to PDV in the asynchronous PSN) and the justifications originally added to the M2 containers. The extracted M1 container is re-mapped inside a new M2 container that has a fixed rate respect to the system clock. The phase comparator and filtering 313 is performed to attenuate jitter introduced by the PSN PDV in case of a network which is asynchronous. In the case of a synchronous network the phase comparator and filtering unit 313 introduces justification caused by the frequency adaptation between the clocks 43C, 32. In an asynchronous network a very low bandwidth (e.g. mHz) is suggested for the filtering 313. In the case of synchronous networks, the phase error will be very small and a very low bandwidth is not needed in the filtering unit 313. Note that the filtering process is on the justification decision.

The scheme described here is applicable to a range of different network scenarios. In the case of synchronous PSN segments, each segment uses a good quality clock. Because of the re-mapping process, the relatively small clock difference between two segments will be conveyed by re-justifications. Because of the synchronous network clock stability and quality, only a low re-justification rate is expected with a small perturbation of the original justification sequence. Having a small variation on the justification sequence, the mapping clock recovery process requires less filtering. When the path is not fully segmented an appropriate narrow bandwidth is necessary because the PDV from the ingress to the last asynchronous PSN will affect the reconstructed clock. The PDV generates a phase error that is several orders of magnitude higher than the re-justification process. PDV is in the order of packets (milliseconds), the re-justification is introducing a phase variation of one clock cycle. Note also that the long "locking time" is related to reference clock; this will not affect the locking time for the TDM signal inside M1 container that is untouched at this stage.

Figure 12:
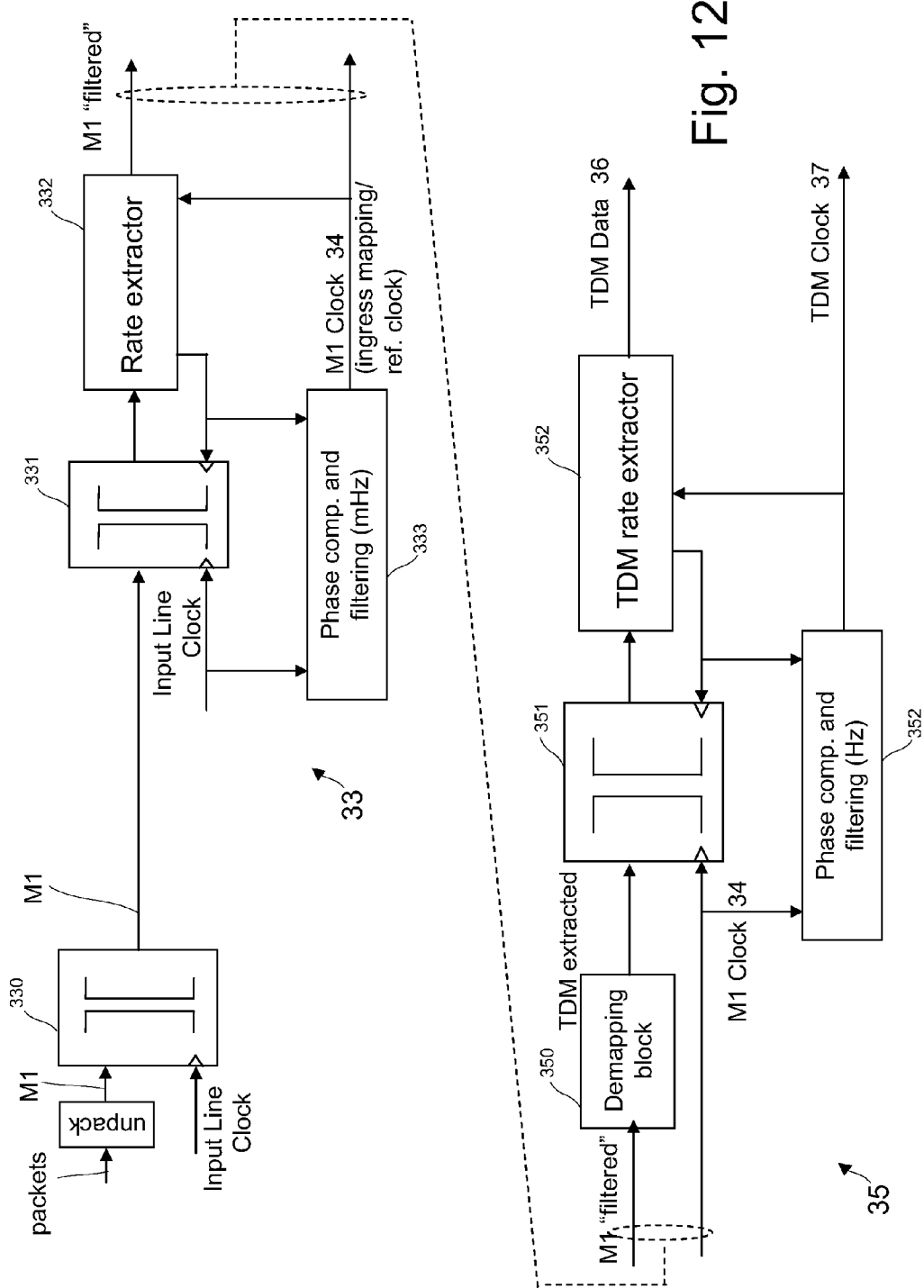
FIG. 12 shows the apparatus of FIG. 6 for use at an egress Inter-working function (IWF) in more detail.

FIG. 12 shows the egress IWF 30 where a single stage of data mapping has been used at the ingress IWF 20. Packets received from the PSN 40 are unpacked and M1 containers are applied to a buffer 330. The input line clock is also applied to the buffer 330. A rate extraction unit 332 and determines the average rate of the packets and outputs a recovered M1 clock 34. The filtered M1 containers and the recovered M1 clock are applied to the demapping stage 35 which is exactly as previously described for FIG. 10.

Figure 13:
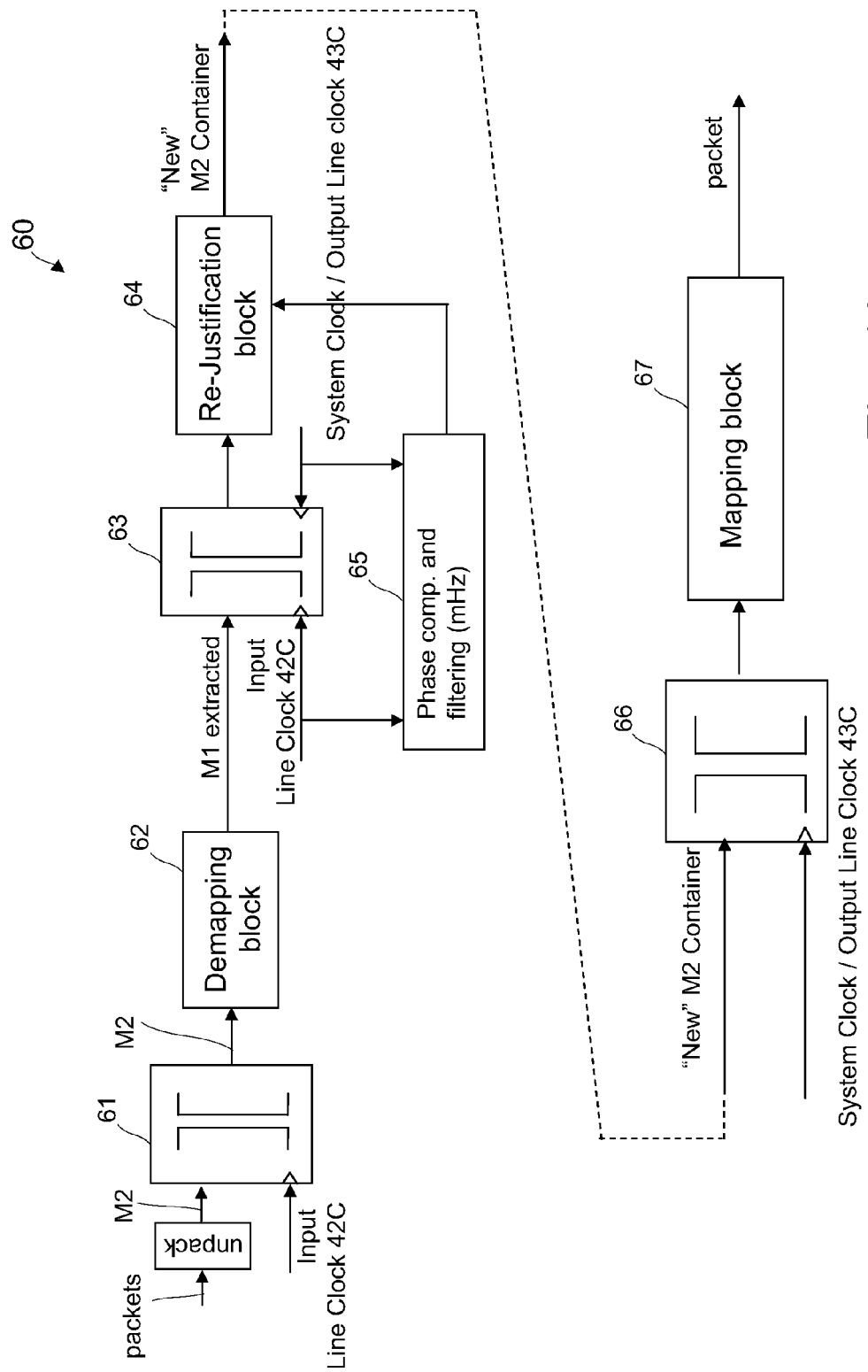
FIG. 13 shows apparatus for re-mapping data containers at an intermediate node of the packet-switched network.

The PSN 40 can comprise multiple domains which are individually operated, each having their own timing reference. FIG. 3 shows three domains 41, 42, 43 with respective clocks 41C, 42C, 43C. An advantageous feature of the invention is to perform a re-mapping of M1 containers at each boundary between domains of the PSN 40. This allows a determination to be made of the difference between the clock rates of each domain, and to convey this information by updating the justification operations to the M1 containers carried within M2 containers. FIG. 13 shows the re-mapping process performed at an edge node positioned between domains of the PSN. The process is similar to the re-mapping stage 31 described for an egress IWF 30 and shown in FIG. 11.

In FIG. 13 the re-mapping occurs at a node which is between a domain 42 having a line clock 42C, and a domain 43 having a line clock 43C. Received packets from the PSN 40 and the input line clock 42C of the local PSN domain 42 are applied to the inputs of a buffer 61. M2 containers are extracted from the packets. A demapping unit extracts M1 containers from the M2 containers. The extracted M1 containers and the input line clock 42C are applied to another buffer 63. As described, there are several ways of implementing apparatus for determining the re-justification rate. A phase comparator and filtering unit 65 can determine the difference between the input line clock 42C and the output line clock 43C. Another implementation is "clock enable" where a comparison is between write and read address of the buffer and determines the new justification rate. The write address contains the "terminated" incoming justification information. The comparison between the read address and the write address will then contain the information about the difference between the output clock and the original mapping clock at the ingress. The use of "clock enable" reduces the number of different clocks inside the equipment and allows the same hardware to be shared between several TDM flows. The determined difference is used to update the justification information of the M1 containers within new M2 containers. This "difference" is the output justification rate. Re-justification block 64 performs the justification, and outputs new M2 containers. The M2 containers and output line clock 43C are applied to another buffer 66 and a mapping block 67 forms the "new" packets for onward transmission across domain 43 of the PSN 40. The new packets are sent to the PSN using the timing of the output line clock 43C.

If the packets are received from a synchronous PSN, the M2 rate is fixed with respect to the Line Clock. In this case, to extract the M1 container a simple justification interpretation function is performed. When the PSN is not synchronous, the M2 rate is not related to the line clock and the extracted M1 rate is a combination of packet arrival time and the original justifications. The extracted M1 container is re-mapped inside a new M2 container that has a fixed rate respect to the System Clock. The Phase comparator and filtering is performed to attenuate jitter introduced by the PSN PDV in case of a network which is not synchronous. In the case of a synchronous network it has to introduce justification for frequency adaptation. In asynchronous network a very low bandwidth is suggested (mHz). In the case of synchronous networks, the phase error will be very small and a very low bandwidth isn't needed. Please note that the filtering process is on the justification decision, this is a digital filtering. Note also that the long "locking time" is related to reference clock; this will not affect the locking time for the TDM signal inside M1 container that is untouched at this stage.

This remapping scheme is particularly useful at the boundary between synchronous networks of two different operators which have different line clocks. The incoming packets, from the first operator network, are at fixed rate (e.g. 1 packet every 100,000 input line clock cycles). The outgoing packets are also sent at a fixed rate (e.g. 1 packet every 100,000 output line clock cycles). Because the two network operators have their own clock reference, 100,000 line clock cycles of one operator represents a different time interval to that of 100,000 line clock cycles of another operator. This difference is compensated by the remapping procedure and is conveyed as justification operations of the M1 containers mapped inside M2 containers.

This operation will greatly improve the final clock quality when all operator are running synchronous networks. Although this re-mapping operation is not essential, it is desirable as it also allows the two operators to debug the network in case of excessive jitter detected or other network defects or failures.

On a single operator synchronous PSN, the same network clock is available at both end of a network path. In this case, using the synchronous network clock as the mapping and demapping clock for M2 containers, all the PDV of the network will be absorbed by the demapper buffer. When the network path crosses two synchronous networks owned by two PSN Operators using their own reference clock the mapping clock is not available at the demapping site. At the customer ingress side, the operator network clock is used as the mapping clock. At an operator boundary (the edge between two operator) the data flow is remapped from operator 1 network clock to operator 2 network clock. The first operator PDV is absorbed by the re-mapper buffer. After the re-mapper, a different number of M1 justifications inside the new M2 will represent the difference between the two networks clocks. At demapping site the second operator network clock is available and can be used to demap the incoming packets. Absorbing the second operator's network PDV. Note the two operators network PDV is just a "scheduling" PDV and not network clock jitter or wander. Thanks to re-mapping the network operator can guarantee that all PDV introduced by PSN equipments is absorbed before sending the packets to second operator.

The second operator can check the incoming signal quality by analysing justifications introduced by the remapping procedure. All M2 justification rate variation represent the quality of the mapping/demapping procedure. If all operators are using synchronous networks, the only variation in the rate of justifications is related to PSN clock jitter/wander. If a PSN operator is using an asynchronous network, the justification rate variation will be mainly affected by the PDV. Because synchronous PSN clock jitter/wander phenomenon are typically several orders of magnitude below PDV phenomenon, it is possible to detect an operator with an asynchronous network or an operator who is not re-mapping data.

The advantages of dual-mapping will now be described. For best performance, it is desirable that the TDM justifications inside M1 containers should be transported across the PSN without alteration. With only one level of mapping the recovered M1 clock is still affected by a residual jitter derived by the very narrow band filtering of the network PDV. This means that the total PDV accumulated on the network path will contribute in term of residual jitter. With a dual-mapping scheme the PDV will not affect the TDM justifications, but will only affect the M1 justifications inside M2. The benefit is that that each synchronous PSN segment can perform a re-mapping function by changing the M1 justification inside M2 and using their own PSN line clock as the new M2 clock. In this way, the PDV inside a synchronous PSN segment will be removed by the remapping function. The only PDV that will affect the final M1 clock recovery at the egress IWF will be the one arising from a network segment which does not have the remapping function. There are also some further benefits of a dual-mapping structure. These include the possibility to monitor the quality of the incoming TDM dual-mapped data. Another benefit is the possibility for a PSN operator to use the overhead section of M2 containers to carry data within that operator's PSN segment, without altering the M1 containers carried within the M2 containers. An end-to-end monitoring and quality check (i.e. between the ingress IWF and egress IWF) can be performed using data within the overhead section of M1 containers.

In the system described above, justification events occur to the data containers M1 carried within the data containers M2. As a packet crosses a PSN, data containers M2 can be subject to multiple justification processes. The effects of the justification processes adds in a cumulative manner. The effect of cumulative justifications can be illustrated with a numerical example. Please note that the values are purposely exaggerated to simplify the explanation. Consider a network having:

an ingress IWF with mapping/reference clock rate=100 Hz (CKI);

a first PSN domain PSN1 with a clock rate=110 Hz (CKN1);

a second PSN domain PSN2 with a clock rate=120 Hz (CKN2);

an egress reference clock rate=130 Hz (CKE).

At the ingress IWF 20 mapping stage 23 conveys the difference (10 Hz) between the mapping/reference clock rate (100 Hz) and the PSN1 clock rate (110 Hz). The mapping of containers M1 within containers M2 carries this frequency difference as justification events. At a node which is at the boundary between PSN domains PSN1 and PSN2 containers M1 are re-mapped within containers M2. The re-mapping stage conveys the difference between the clock rate of domain PSN1 (110 Hz) and the clock rate of domain PSN2 (120 Hz) as justification events. This adds cumulatively with the justifications already carried by the containers M1 within containers M2. At the egress IWF 30 a further re-mapping stage conveys the difference between the clock rate of domain PSN2 and the egress reference clock rate (130 Hz). Again, this adds cumulatively to the justifications already carried by the containers M1 within containers M2. Each mapping/re-mapping stage determines the difference in clock rate between the two clocks that the stage has access to, and forms a cumulative difference which is carried forward through the network. So:

at the ingress/PSN1 boundary: add CKN1-CKI justification rate=>0+(110−100)=10 Hz;

at the PSN1/PSN2 boundary: add CKN2-CKN1 just. rate=>10 Hz+(120−110)=20 Hz;

at the PSN2/egress boundary: add CKE-CKN2 just. rate=>20 Hz+(130−120)=30 Hz.

The result is:

$$CKE-CKN2+CKN2-CKN1+CKN1-CKI=CKE-CKI$$

which amounts to a cumulative 30 Hz frequency difference in this simplified example. Therefore, the containers arriving at the egress IWF convey the cumulative frequency difference between the reference clock at the egress IWF and the reference clock used at the ingress IWF. The containers M1 are unaffected during transport across the PSN, and preserve the frequency difference of the TDM clock with respect to the reference clock used at the ingress IWF.

FIG. 14 shows a network where multiple mobile operators X, Z share the same inter-working functions 20, 30. Each mobile operator has a particular TDM clock (service clock) which, typically, will be different to the other operator. Using the techniques described above, ingress IWF 20 maps the data of each operator in a manner which preserves the difference between the respective service clock and the clock used at the IWF 20, or the line clock of the PSN 40. Similarly, the egress IWF 30 can extract the TDM clock of each operator independently of the TDM clock of other operators. Of course, mobile operators X, Z do not need to share the same ingress and egress IWF 20, 30, e.g. IWF 20 may serve mobile operators X, Z while IWF 30 may serve mobile operators X, Y.

Figure 15:
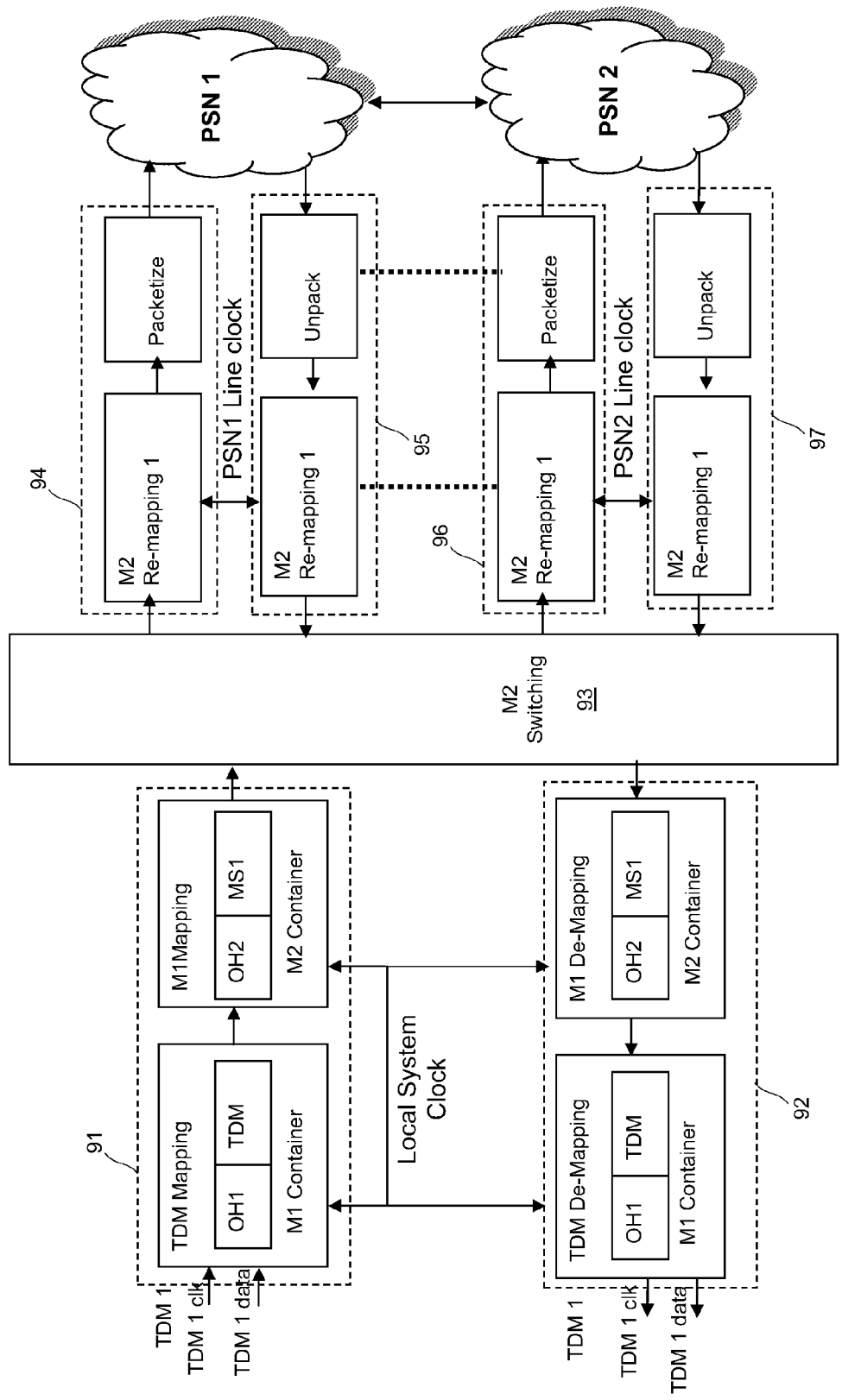
FIG. 15 shows an add-drop multiplexer with functionality of an ingress IWF and an egress IWF.
Figure 16:
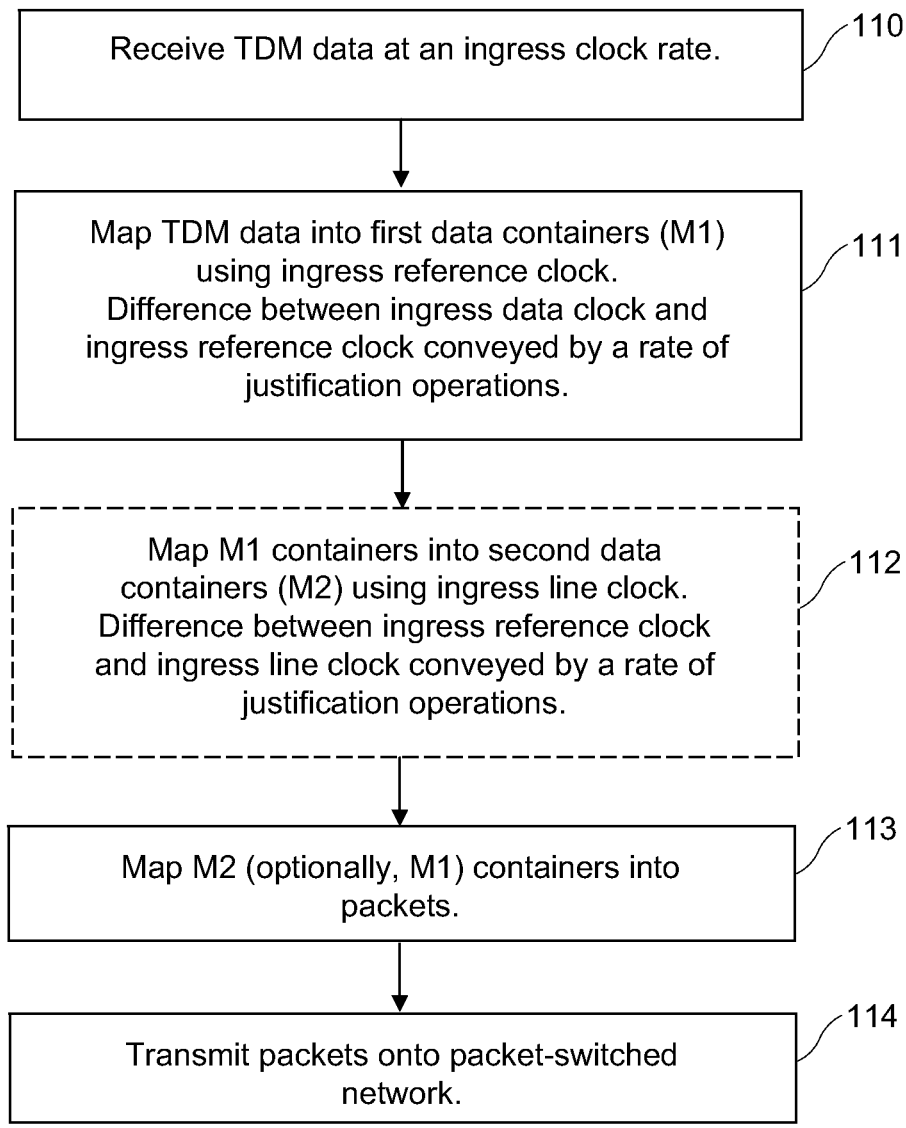
FIG. 16 shows steps of a method performed at an ingress IWF.

FIGS. 15 and 16 show an add-drop multiplexer (ADM) which incorporates the functionality of an ingress IWF and an egress IWF described above and also a switching capability. Switching, and multiplexing/de-multiplexing is performed at the level of M2 containers. This preserves the mapping of TDM data within M1 containers, and hence preserves the timing information carried within M1 containers.

In the ingress direction to the PSN, TDM traffic is subject to two stages of mapping 91, as previously described. The M1 mapping stage uses the local system clock. FIG. 15 shows processing of a single ingress traffic flow but there can be N such flows which are processed in a similar manner. M2 containers resulting from the stages 91 are multiplexed as required by a switching function 93 to form an output stream of M2 containers destined for each PSN, i.e. an output stream of M2 containers destined for PSN1 and an output stream of M2 containers destined for PSN2. Each multiplexed stream is then passed to a stage 94 where M2 containers are re-mapped to form new M2 containers matched to the line clock rate of the destination PSN. The re-mapping process is the same as described in FIGS. 11 and 13.

In the egress direction from the PSN, packets are unpacked and M2 containers are re-mapped to match the local system clock rate. Again, this process is the same manner as described in FIGS. 11 and 13. Containers are de-multiplexed at the M2 level by the M2 switching function 93 operating at the local system clock rate. Each egress traffic flow is then processed by a stage 92 which is similar to that shown earlier in FIGS. 5 and 10.

The ADM shown here is a multi-purpose machine. Parts of the functionality of the ADM can be selectively used depending on the specific function needed at a node. For example, the ADM can provide a re-mapping function for one connection "in transit" and can also be used as ingress or egress node for another connection. For packets which are in transit, packets are received from one PSN (e.g. PSN1), processed by stage 95, switched to the output stream destined for the appropriate PSN (e.g. PSN2) by stage 93 and then processed by stage 96. As switching block 93 switches M2 containers which are all at a fixed rate relative to the system clock the switching block 93 can be a packet oriented switch or a TDM-like switch.

Justification Example

The justification rate depends on two factors: the nominal container bitrates and the difference between the mapping clock and the mapped clock. As an example, in SDH networks the nominal container rates are chosen in a way to have no justifications when the signal that has to be mapped and the mapping clock are at their nominal frequencies. Because of this, positive and negative justification capability, are provided by the SDH containers. In PDH networks there is only one justification slot. This means that at nominal rate there is a nominal justification rate. When the ratio between the clocks is different from the nominal clock ratio there will be less or more justification events than in the nominal case.

The following worked example gives an overview of the justification process. The values are purposely simplified to ease explanation.

Consider:
  nominal TDM clock=100 Hz;
  nominal Mapping clock 110 Hz.
"Nominal" means the normal, expected, values of these clocks.
TDM data is mapped into a container which comprises:
  Byte 1: Header. It also contains the justification decision (byte H).
  Byte 2: Justification opportunity space (byte O). This carries payload data or stuff depending on byte H contents.
  Bytes 3-12: Ten payload data bytes.
This can be represented as:
  H,O,D,D,D,D,D,D,D,D,D,D
The container speed (set by mapping clock)=110 bps.
Now call H+ the header byte value when data is carried by the justification opportunity byte "O", and call H− the header byte when the justification opportunity byte is not used (contains "stuff").
H+/H− Header byte
D: TDM Payload byte
S: Stuff (ignored).
Two types of container are possible:
  1. Container C+: H+,D,D,D,D,D,D,D,D,D,D,D
    This 12 byte frame has 11 bytes of data and 1 byte of overhead.
    This occurs when the justification opportunity byte O is filled with data because of the justification decision. The decision is to use the O slot as a data byte.
    The data capacity is 11/12 of bitrate. The container rate is 110 bps and the allowable maximum payload rate is 110*11/12=100.8 bps.
  2. Container C−: H−,S,D,D,D,D,D,D,D,D,D,D
    This 12 bytes frame has 10 bytes of data, 1 byte of overhead and one stuff byte (S). This occurs when the justification opportunity byte is empty. Opportunity byte O carries stuff data.
    The data capacity is 10/12 of the bitrate. The container rate is 110 bps and the allowable maximum payload rate is 110*10/12=91.7 bps.
Let A=Number of containers with 10 Data bytes (Container C−)
Let B=Number of containers with 11 Data bytes (Container C+)

$$(A*10+B*11)/(A+B)=K=\text{Average number of bytes}$$

$$A*10+B*11=K*(A+B)$$

$$A*10-K*A=K*B-B*11$$

$$A*(10-K)=B*(K-11)$$

$$A/B=(K-11)/(10-K) \quad (1)$$

MR=mapping rate=110
PR=payload rate=100

$$MR*(A*10/12+B*11/12)/(A+B)=PR$$

$$MR*(A*10+B*11)/12/(A+B)=PR$$

$$MR/12*(A*10+B*11)/(A+B)=MR/12*K=PR$$

$$MR/12*K=PR$$

$$K=12*PR/MR \quad (2)$$

Then using (1) gives:

$$A/B=(12*PR/MR-11)/(10-12*PR/MR)=0.1=\text{Justification ratio}.$$

Then: $A=0.1*B$ or $B=10*A$

This means that for the chosen rates and containers, at nominal rate (i.e. TDM clock and mapping clock are at normal frequencies) there will be ten times containers C+ (containers with 11 bytes) for each container C− (containers with 10 bytes). As the difference between the TDM clock and mapping clock varies from their nominal values, the justification rate, and justification ratio, will also change from their nominal values. It should be understood that this is only a generic example on how to calculate the justification rate given a container type, a justification scheme, a mapping clock and a payload clock.

Figure 17:
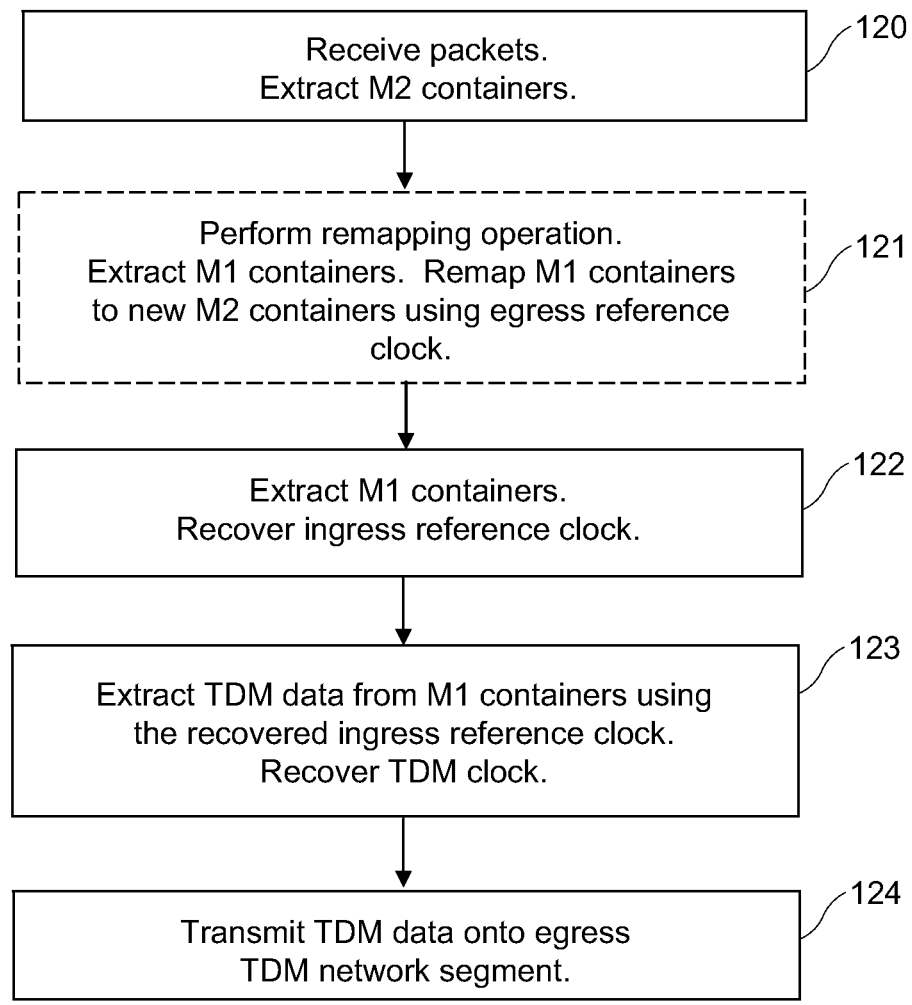
FIG. 17 shows steps of a method performed at an egress IWF.
Figure 18:
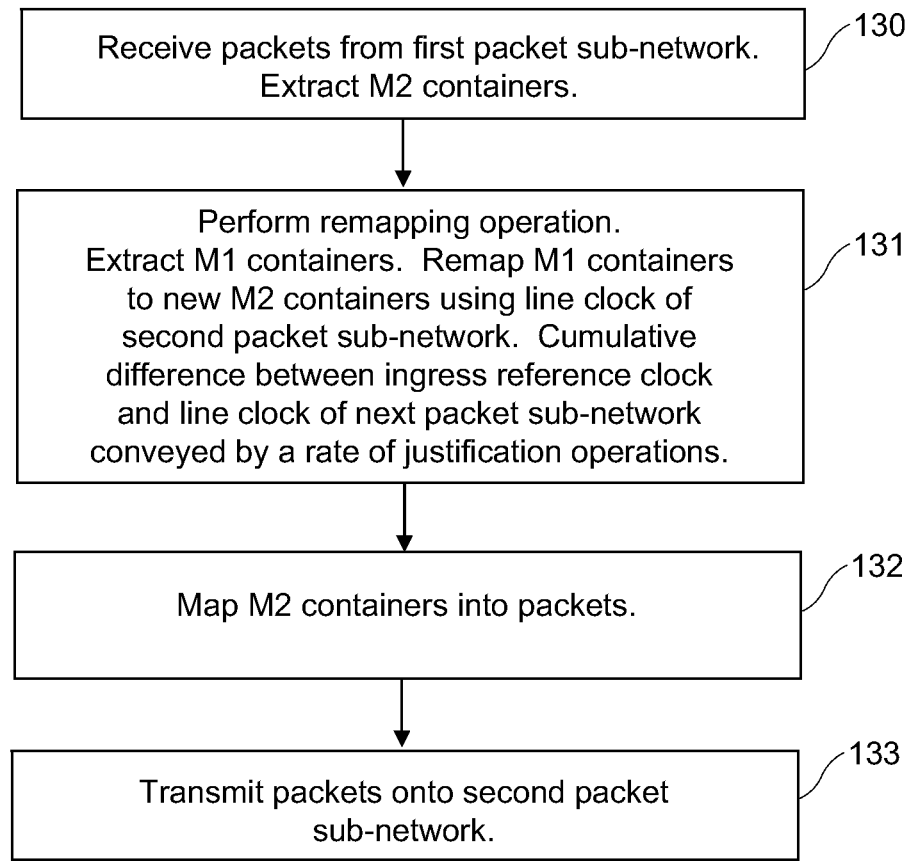
FIG. 18 shows steps of a method performed at an intermediate node of the packet-switched network.

For completeness, FIGS. 16 to 18 show flow charts summarising the steps of the methods which have been described above. FIG. 16 shows steps 110-114 of a method performed at an ingress IWF. FIG. 17 shows steps 120-124 of a method performed at an egress IWF. FIG. 18 shows steps 130-133 of a method performed at an intermediate node of the packet-switched network, between packet sub-networks or domains.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of clock recovery in a network comprising an ingress TDM network segment and an egress TDM network segment which are connected by a packet-switched network, an ingress inter-working function at an interface between the ingress TDM network segment and the packet-switched network and an egress inter-working function at an interface between the packet-switched network and the egress TDM network segment, the method comprising, at the ingress inter-working function:
  receiving a TDM traffic flow comprising TDM data which is clocked by an ingress data clock;
  performing a first mapping function which maps the TDM data into first data containers using an ingress reference clock, wherein the first mapping function conveys a difference between the ingress data clock and the ingress reference clock which can be recovered by the egress inter-working function, the difference being conveyed by a rate of justification operations to the mapped data within the first data containers;
  performing a packetising function which maps the first data containers into payloads of packets; and,
  transmitting the packets onto the packet-switched network.

2. A method according to claim 1 wherein the first data containers are a sequence of first data containers generated at a constant rate.

3. A method according to claim 1 further comprising:
  performing a second mapping function after the first mapping function and before the packetising function, the second mapping function mapping the first data containers into second data containers, wherein the second mapping function uses an ingress line clock and the mapping conveys a difference between the ingress reference clock and the ingress line clock, the difference being conveyed by a rate of justification operations to the mapped data within the second data containers;

and wherein the packetising function maps the second data containers into payloads of packets.

4. A method according to claim 3 wherein the second data containers are a sequence of second data containers generated at a constant rate.

5. A method according to claim 3 further comprising:
mapping the first data containers into second data containers using the ingress reference clock;
switching second data containers of a plurality of TDM traffic flows to form a multiplexed flow for the packet network;
extracting first data containers from the second data containers of the multiplexed flow;
performing the second mapping function on the extracted first data containers.

6. A method according to claim 1 further comprising performing the method for a plurality of TDM traffic flows which are clocked by different ingress data clocks and wherein the step of performing a first mapping function conveys, for each TDM traffic flow, a difference between the ingress data clock of that traffic flow and the ingress reference clock.

7. A method according to claim 6 wherein the TDM traffic flows are traffic flows of different network operators.

8. A method according to claim 1 wherein the ingress reference clock is a free-running clock source local to the ingress inter-working function.

9. A method according to claim 1 wherein at least one of the first data container and the second data container are synchronous transmission network containers.

10. A method according to claim 1 wherein the data containers comprise a justification field and the justification operation comprises selectively using the justification field to carry TDM data or stuff data.

11. A non-transitory computer readable medium storing machine-readable instructions causing a processor to perform the method of claim 1.

12. A method of clock recovery in a network comprising an ingress TDM network segment and an egress TDM network segment which are connected by a packet-switched network, an ingress inter-working function at an interface between the ingress TDM network segment and the packet-switched network and an egress inter-working function at an interface between the packet-switched network and the egress TDM network segment, the method comprising, at the egress inter-working function:
receiving packets from the packet-switched network;
extracting first data containers from payloads of the packets;
recovering an ingress reference clock from the first data containers, wherein the ingress clock has been used by the ingress inter-working function to map TDM data into the first data containers;
extracting TDM data from the first data containers using the recovered ingress reference clock, wherein the extracted TDM data conveys a difference between the ingress data clock and the ingress reference clock by a rate of justification operations to the TDM data;
recovering an ingress data clock from the extracted TDM data rate.

13. A method according to claim 12 wherein the payloads of the packets carry second data containers, the first data containers being carried within the second data containers, the method further comprising:

extracting the first data containers from the second data containers;
recovering the ingress reference clock from the extracted first data containers.

14. A method according to claim 13 wherein data extracted from the second containers includes justification operations representing a cumulative difference between the ingress reference clock and a line clock used by the packet switched network.

15. A method according to claim 13 further comprising performing a re-mapping function before the step of extracting the first data containers from the second data containers, the re-mapping function mapping second data containers in payloads of the received packets into further second data containers at a rate determined by an egress reference clock.

16. A method according to claim 15 wherein the re-mapping function performs justification operations to convey a cumulative difference between an ingress reference clock and the egress reference clock.

17. A method according to claim 12 further comprising performing the method for a plurality of TDM traffic flows which are clocked by different ingress data clocks and wherein the step of recovering an ingress data clock recovers the ingress data clock associated with a particular TDM traffic flow.

18. A method according to claim 17 wherein the TDM traffic flows are traffic flows of different network operators.

19. A method of processing packets carrying clock information in a network in a network comprising an ingress TDM network segment and an egress TDM network segment which are connected by a packet-switched network comprising a plurality of packet sub-networks using different reference clocks, an ingress inter-working function at an interface between the ingress TDM network segment and the packet-switched network and an egress inter-working function at an interface between the packet-switched network and the egress TDM network segment, the method comprising performing the method of claim 18, at each node between packet sub-networks of the packet-switched network.

20. A method according to claim 12 further comprising performing the method for a plurality of TDM traffic flows which have been mapped to first data containers by ingress inter-working functions having different ingress reference clocks, and wherein the step of extracting first data containers recovers the ingress reference clock associated with a particular TDM traffic flow.

21. Apparatus for clock recovery in a network comprising an ingress TDM network segment and an egress TDM network segment which are connected by a packet-switched network, an ingress inter-working function at an interface between the ingress TDM network segment and the packet-switched network and an egress inter-working function at an interface between the packet-switched network and the egress TDM network segment, the apparatus comprising, at the ingress inter-working function:
an input for receiving a TDM traffic flow comprising TDM data which is clocked by an ingress data clock;
a first mapping function which is arranged to map the TDM data into first data containers using an ingress reference clock, wherein the first mapping function conveys a difference between the ingress data clock and the ingress reference clock which can be recovered by the egress inter-working function, the difference being conveyed by a rate of justification operations to the mapped data within the first data containers;
a packetising function which is arranged to map the first data containers into payloads of packets; and, an output for transmitting the packets onto the packet-switched network.

22. Apparatus according to claim 21 further comprising:
a second mapping function, positioned after the first mapping function and before the packetising function, the second mapping function arranged to map the first data containers into second data containers, wherein the second mapping function uses an ingress line clock and the mapping conveys a difference between the ingress reference clock and the ingress line clock, the difference being conveyed by a rate of justification operations to the mapped data within the second data containers;
and wherein the packetising function is arranged to map the second data containers into payloads of packets.

23. Apparatus for clock recovery in a network comprising an ingress TDM network segment and an egress TDM network segment which are connected by a packet-switched network, an ingress inter-working function at an interface between the ingress TDM network segment and the packet-switched network and an egress inter-working function at an interface between the packet-switched network and the egress TDM network segment, the apparatus comprising, at the egress inter-working function:
an input for receiving packets from the packet-switched network;
a first extraction function arranged to extract first data containers from payloads of the packets;
a first clock recovery function arranged to recover an ingress reference clock from the first data containers, wherein the ingress clock has been used by the ingress inter-working function to map TDM data into the first data containers;
a second extraction function arranged to extract TDM data from the first data containers using the recovered ingress reference clock, wherein the extracted TDM data conveys a difference between the ingress data clock and the ingress reference clock by a rate of justification operations to the TDM data;
a second clock recovery function arranged to recover an ingress data clock from the extracted TDM data rate.

24. Apparatus according to claim 23 wherein the payloads of the packets carry second data containers, the first data containers being carried within the second data containers, the apparatus further comprising:
a third extraction function arranged to extract the first data containers from the second data containers;
and wherein the first clock recovery function is arranged to recover the ingress reference clock from the extracted first data containers.

* * * * *